United States Patent
Miyata et al.

(10) Patent No.: US 6,171,210 B1
(45) Date of Patent: Jan. 9, 2001

(54) TOROIDAL TYPE CONTINUOUS VARIABLE TRANSMISSION SYSTEM

(75) Inventors: Shinji Miyata; Takashi Imanishi, both of Kanagawa (JP)

(73) Assignee: NSK Ltd., Tokyo (JP)

( * ) Notice: Under 35 U.S.C. 154(b), the term of this patent shall be extended for 0 days.

(21) Appl. No.: 09/132,669

(22) Filed: Aug. 12, 1998

(30) Foreign Application Priority Data

| Aug. 12, 1997 | (JP) | 9-217698 |
| Aug. 12, 1997 | (JP) | 9-217699 |
| Oct. 9, 1997 | (JP) | 9-276913 |

(51) Int. Cl.$^7$ ................................................. F16H 15/38
(52) U.S. Cl. ................................................. 475/216
(58) Field of Search ..................... 475/207, 215, 475/216

(56) References Cited

U.S. PATENT DOCUMENTS

| 1,833,475 | * | 11/1931 | Standish | 475/216 |
| 5,090,951 | | 2/1992 | Greenwood | 475/216 |
| 5,238,460 | * | 8/1993 | Esaki et al. | 475/216 X |
| 5,401,221 | * | 3/1995 | Fellows et al. | 475/216 X |
| 5,453,061 | * | 9/1995 | Fellows | 475/215 |

FOREIGN PATENT DOCUMENTS

| 41 07 739 | 9/1991 | (DE) . |
| 1-169169 | 7/1989 | (JP) . |
| 1-312266 | 12/1989 | (JP) . |
| 6-21625 | 3/1994 | (JP) . |
| 7-96901 | 10/1995 | (JP) . |
| 9-89071 | 3/1997 | (JP) . |
| 9-210191 | 8/1997 | (JP) . |

| WO 91/08406 | 6/1991 | (WO) . |

OTHER PUBLICATIONS

"The Design and Development of an Experimental Traction Drive CVT for a 2.0 Litre FWD Passenger Car", Fellows et al., SAE Technical Paper Series, 910408, International Congress and Exposition Detroit, Michigan, Feb. 25, 1991–Mar. 1, 1991; pp. 9–19.

* cited by examiner

Primary Examiner—Sherry L. Estremsky
(74) Attorney, Agent, or Firm—Sughrue, Mion, Zinn, Macpeak & Seas, PLLC

(57) ABSTRACT

A toroidal type continuous variable transmission system to be used as a transmission of an automobile comprises: an input shaft rotatably actuated by means of a drive source; an output shaft for acquiring power stemming from rotation of the input shaft; a variator which is interposed between the input and output shafts and includes a pair of input disks which rotate on the basis of rotation of the input shaft, a pair of output disks which are provided in a coaxial relationship with the input disks and rotate in synchronous with each other, and power rollers which are provided between the input and output disks while remaining in contact with the disks and which rotate at an angle; a planetary gear mechanism which is interposed between the input and output shafts and includes a sun gear, a ring gear provided around the sun gear, a plurality of planetary gears which are provided between the sun gear and the ring gear so as to be rotatable, and carriers supporting the planet gears; a pressing mechanism which presses the input or output disk against the output or input disk by way of the power rollers; a first power transmission mechanism which transmits the rotation of the output disks to the planetary gear mechanism; and a second power transmission mechanism which transmits the rotation of the input shaft to the planetary gear mechanism.

19 Claims, 11 Drawing Sheets

TOROIDAL TYPE CONTINUOUS VARIABLE TRANSMISSION SYSTEM

BACKGROUND OF THE INVENTION

1. Field of the Invention

The present invention relates to a toroidal type continuous variable transmission system used as, e.g., a transmission of an automobile.

2. Related Background Art

A toroidal type continuous variable transmission system used as, for example, a transmission of an automobile has been known as described in, e.g., Japanese Patent Unexamined Publication Nos. Hei. 1-169169 and Hei. 1-312266. The toroidal type continuous variable transmission system comprises a toroidal type continuous variable transmission including a power roller which is rotatably interposed at an angle between input and output disks while remaining in contact with them; and a planetary gear mechanism connected to the output disk. The planetary gear mechanism comprises first and second planetary gear sets having sun gears connected to the output disk; a first power transmission mechanism which fixes a given element of the first planetary gear set to thereby selectively obtain a rotational force opposite to the direction of the output disk and transmits the thus-obtained rotational force to the second planetary gear set and an output shaft; and a second power transmission mechanism which connects a given element of the second planetary gear set to the input disk to thereby selectively obtain a rotational force opposite to the direction of the output disk and transmits the thus-obtained rotational force to the output shaft.

More specifically, the toroidal type continuous variable transmission system comprises a single cavity toroidal type continuous variable transmission and a set of two-staged planetary gears. A given element of the first planetary gear set is fixed by actuation of the first power transmission mechanism, thereby transmitting the torque of the output disk of the toroidal type continuous variable transmission to the output shaft by way of the first planetary gear set so as to cause a rotation in the direction opposite to the direction in which an input shaft rotates. As a result, there is obtained a first forward movement mode.

In the first mode, while the toroidal type continuous variable transmission is set in the maximum speeding-up position, the first power transmission mechanism is brought into an inactive state. A second power transmission mechanism is actuated in place of the first power transmission mechanism, thereby fixing a given element of the second planetary gear set. As a result, the torque of the input shaft is transmitted to the output shaft not by way of the toroidal type continuous variable transmission but directly by way of the second planetary gear set, thus realizing a second forward movement mode, or what is called a power circulation state in which part of the torque is returned to the input shaft by way of the second planetary gear set and the toroidal type continuous variable transmission.

In a continuously variable transmission described in Japanese Patent Examined Publication No. Hei 6-21625, the transmission comprises a double-cavity toroidal type continuous variable transmission and a two-staged planet gear mechanism. A planet carrier of a first planetary mechanism and a sun gear of a second planet gear mechanism are actuated by means of an output shaft of the continuously variable transmission. A sun gear of the first planetary gear mechanism and a ring gear of the second planetary gear mechanism are actuated by means of an engine. A ring gear of the first planetary gear mechanism acts as a low-speed output section, and the planetary carrier of the continuously variable transmission acts as a high-speed output section.

Therefore, to maintain an automobile in a standstill state without rotating a final drive shaft, there is prevented transmission of torque to the ring gear, which would otherwise be caused when the rotational speed of the planet carrier of the first planet gear mechanism cancels the rotation of the sun gear A transmission gear ratio of the transmission is thus set. Namely, by means of a mechanism for acquiring a differential component of each component of the planet gear mechanism, the automobile can be maintained in a standstill state without use of a start clutch, so long as the differential component is adjusted to zero. When the automobile starts, the transmission gear ratio of the transmission is gradually increased in such a manner that torque is gradually transmitted to the ring gear.

However, the conventional toroidal type continuous variable transmission systems described in Japanese Patent Unexamined Publication Nos. Hei. 1-169169 and Hei. 1-312266 require incorporation of two sets of planetary gear mechanisms, thus rendering the structure of the system complex and adding to cost. Further, the systems requires large installation space. Furthermore, a single cavity toroidal type continuous variable transmission suffers an inferior power transmission efficiency and cannot transmit great torque.

In a case where a mechanical loading cam is incorporated into a gear neutral system described in Japanese Patent Examined Publication No. Hei. 6-21625, an input disk is pressed against an output disk by way of a power roller. Depending on a transmission gear ratio, torque which is smaller than engine torque is input to a variator, whereas 100% of engine torque is input to the mechanical loading cam, thereby causing excessively great pressing force. In such a case, 100% of engine torque is input to the mechanical loading cam, whilst torque greater than the engine torque is input to the variator, thus producing excessively small pressing force. In the event of excessively great pressing force, the efficiency of power transmission is deteriorated, thus disabling transmission of great torque. In contrast, in the event of excessively small pressing force, the pressing force becomes insufficient, thus causing slippage. Since there is used a two-staged planetary gear set is used, as in the case of the previous example, the system becomes bulky.

SUMMARY OF THE INVENTION

The present invention has been conceived in view of the foregoing circumstances, and the object of the present invention is to improve a power transmission efficiency, as well as to provide a toroidal type continuous variable transmission system which can reduce a load exerted on a variator while preventing an excessive pressing force from being exerted on the variator.

To this end, according to one aspect of the present invention, there is provided a toroidal type continuous variable transmission system to be used as a transmission of an automobile comprising:

an input shaft rotatably actuated by means of a drive source;
an output shaft for acquiring power stemming from rotation of the input shaft;
a variator which is interposed between the input and output shafts and includes
a pair of input disks which rotate on the basis of rotation of the input shaft, a pair of output disks which are provided in a coaxial
relationship with the input disks and rotate in
synchronous with each other, and
power rollers which are provided between the input
and output disks while remaining in contact with
the disks and which rotate at an angle;
a planetary gear mechanism which is interposed
between the input and output shafts and includes
a sun gear,
a ring gear provided around the sun gear,
a plurality of planetary gears which are provided
between the sun gear and the ring gear so as to be
rotatable, and carriers supporting the planet gears,
a pressing mechanism which presses the input or output
disk against the output or input disk by way of the
power rollers;
a first power transmission mechanism which transmits
the rotation of the output disks to the planetary gear
mechanism; and
a second power transmission mechanism which transmits the rotation of the input shaft to the planetary
gear mechanism.

In the toroidal type continuous variable transmission having the foregoing configuration, torque can be transmitted from the output disk to the planetary gear mechanism, and the power of the planetary gear mechanism can be circulated through the variator. The torque of the input shaft can be transmitted to the planetary gear mechanism by bypassing the variator. As a result, the torque input to the variator at the time of high-speed or low-speed driving is reduced, thus enabling an improvement in the durability of the constituent components of the variator.

Preferably, the first power transmission mechanism circulates the power of the planetary gear mechanism through the variator, and the second power transmission mechanism transmits the rotation of the input shaft to the planetary gear mechanism by bypassing the variator.

According to a second aspect of the present invention, there is provided a toroidal type continuous variable transmission system to be used as a transmission of an automobile comprising:
an input shaft rotatably actuated by means of a drive
source;
an output shaft for acquiring power stemming from
rotation of the input shaft;
a variator which is interposed between the input and
output shafts and includes
a pair of input disks which rotate in association with
rotation of the input shaft,
a pair of output disks which are provided in a coaxial
relationship with the input disks and rotate in
synchronous with each other, and
power rollers which are provided between the input
and output disks while remaining in contact with
the disks and which rotate at an angle;
a planetary gear mechanism which is interposed
between the input and output shafts and includes
a sun gear,
a ring gear provided around the sun gear,
a plurality of planetary gears which are provided
between the sun gear and the ring gear so as to be
rotatable, and
carriers supporting the planet gears,
a mechanical pressing mechanism which presses the
input or output disk against the output or input disk
by way of the power rollers;
a first power transmission mechanism which transmits
the rotation of the output disks to the planetary gear
mechanism and circulates the power of the planetary
gear mechanism through the variator; and
a second power transmission mechanism which transmits the rotation of the input shaft to the planetary
gear mechanism by bypassing the variator.

Preferably, the mechanical pressing mechanism presses the input disk against the output disk byway of the power rollers.

Preferably, the mechanical pressing mechanism presses the output disk against the input disk by way of the power rollers.

Preferably, the pair of input disks are provided at the center of the variator so as to face opposite directions; the pair of output disks are provided so as to face the input disks; and the sun gear rotates the output shaft.

Preferably, the sun gear rotates the output shaft.

Preferably, the ring gear rotates the output shaft.

Preferably, the first power transmission mechanism is constituted of a counter shaft which transmits the rotation of the output disk to the carriers and circulates the power of the planetary gear mechanism through the variator, and the second power transmission mechanism is constituted of a bypass shaft which transmits the rotation of the input shaft to the planetary gear mechanism by bypassing the variator.

Preferably, the bypass shaft passes through the inside of the variator and transmits the rotation of the input shaft to the ring gear.

Preferably, the bypass shaft is provided outside the variator and transmits the rotation of the input shaft to the ring gear.

Preferably, the first power transmission mechanism transmits the rotation of the output disk to the carriers, and the second power transmission mechanism is constituted of a bypass shaft which transmits the rotation of the input shaft and that of the input disk to the planetary gear mechanism by bypassing the variator.

Preferably, the first power transmission mechanism transmits the rotation of the output disk to the carriers, and the second power transmission mechanism is constituted of a bypass shaft which transmits the rotation of the input shaft and that of the input disk to the planetary gear mechanism by bypassing the variator.

Preferably, the first power transmission mechanism is constituted of a counter shaft which transmits the rotation of the output disk to the carriers and circulates the power of the planetary gear mechanism through the variator, and the second power transmission mechanism transmits the rotation of the input shaft to the planetary gear mechanism by bypassing the variator.

Preferably, the first power transmission mechanism is constituted of a counter shaft which transmits the rotation of the output disk to the sun gear and circulates the power of the planetary gear mechanism through the variator, and the second power transmission mechanism is constituted of a bypass shaft which transmits the rotation of the input shaft to the carriers by bypassing the variator.

Preferably, the bypass shaft passes through the inside of the variator and transmits the rotation of the input shaft to the carriers.

Preferably, the bypass shaft is provided outside of the variator and transmits the rotation of the input shaft to the carriers.

According to a third aspect of the present invention, there is provided a toroidal type continuous variable transmission system to be used as a transmission of an automobile comprising:
a start clutch for transmitting an output from a drive
source;

an input shaft rotatably actuated by means of the drive source;
an output shaft for acquiring power stemming from rotation of the input shaft;
a variator which is interposed between the input and output shafts and includes
 a pair of input disks which are provided so as to face each other and rotate in association with rotation of the input shaft,
 a pair of output disks which are provided between the pair of input disks in a coaxial relationship with the input disks and rotate in synchronous with each other, and
 power rollers which are provided between the input and output disks while remaining in contact with the disks and which rotate at an angle;
a planetary gear mechanism which is interposed between the input and output shafts and includes
 a sun gear for rotating the output shaft,
 a ring gear provided around the sun gear,
 a plurality of planetary gears which are provided between the sun gear and the ring gear so as to be rotatable, and
 carriers supporting the planet gears,
a hydraulic pressing mechanism which is interposed between the input shaft and the input disks and presses the input disk against thy output disk by way of the power rollers;
a first power transmission mechanism which transmits the rotation of the output disks to the carriers; and
a second power transmission mechanism which transmits the rotation of the input shaft to the ring gear.

According to a fourth aspect of the present invention, there is provided a toroidal type continuous variable transmission system to be used as a transmission of an automobile comprising:
an input shaft rotatably actuated by means of a drive source;
an output shaft for acquiring power stemming from rotation of the input shaft;
a variator which is interposed between the input and output shafts and includes
 a pair of input disks which rotate on the basis of rotation of the input shaft,
 a pair of output disks which are provided in a coaxial relationship with the input disks and rotate in synchronous with each other, and
 power rollers which are provided between the input and output disks while remaining in contact with the disks and which rotate at an angle;
a planetary gear mechanism which is interposed between the input and output shafts and includes
 a sun gear,
 a ring gear provided around the sun gear,
 a plurality of planetary gears which are provided between the sun gear and the ring gear so as to be rotatable, and
 carriers supporting the planet gears;
a loading cam which is provided between the input shaft and the input disks and presses the input disk against the output disk by way of the power rollers; and
a power transmission shaft provided in a coaxial relationship with the input shaft, wherein the rotation of the power transmission shaft is freely input to any one of the sun gear, the ring gear, and the carriers; the rotation of the pair of the output disks is freely input to another member to which the rotation of the power transmission shaft is not transmitted, by means of the sun gear, the ring gear, and the carriers; and the other one member to which neither the rotation of the power transmission shaft nor the rotation of the output disk is transmitted is connected to the output shaft by means of any of the sun gear, the ring gear, and the carriers.

In the toroidal type continuous variable transmission having the foregoing configuration, at the time of low-speed driving, the clutch is switched so that the carrier of the planetary gear mechanism is connected to the ring gear and so that the second transmission mechanism is disconnected from the ring gear. At the time of low-speed driving, the transmission gear ratio of the input disk to the output disk is converted in the same manner as in the conventional variator. As a matter of course, in this condition, the transmission gear ratio of the input shaft to the output shaft, i.e., the transmission gear ratio of the overall variable transmission system, is proportional to the transmission gear ratio of the variator. Further, in this state, the torque input to the variator equals the torque applied to the input shaft.

In contrast, at the time of high-speed driving, the clutch is switched so that the second power transmission mechanism is connected to the ring gear and so that the carrier is disconnected from the ring gear. As a result, the planetary gear mechanism transmits power to the output shaft from the input shaft. Further in this state, torque is transmitted to the output disk of the variator from the carrier constituting the planetary gear mechanism, by way of the second power transmission mechanism. In this state, the transmission ratio of the overall variable transmission system changes in accordance with the revolving speed of the planetary gear. For this reason, so long as the revolving speed of the planetary gear is changed by changing the transmission ratio of the variator, the transmission ratio of the overall variable transmission mechanism can be controlled. In short, in this state, as the speed ratio of the variator is changed to a decelerating side, the transmission ratio of the overall variable transmission changes to an accelerating side. In such a high-speed driving condition, as the transmission ratio of the variator is changed to a decelerating side in order to change the transmission ratio of the overall variable transmission system toward the accelerating side, smaller torque is input to the variator. As a result, the torque input to the variator is reduced at the time of high-speed driving, thus improving the durability of the constituent components of the variator.

DETAILED DESCRIPTION OF THE PREFERRED EMBODIMENTS

Preferred embodiments of the present invention system will be described hereinbelow by reference to the accompanying drawings.

Figure 1:
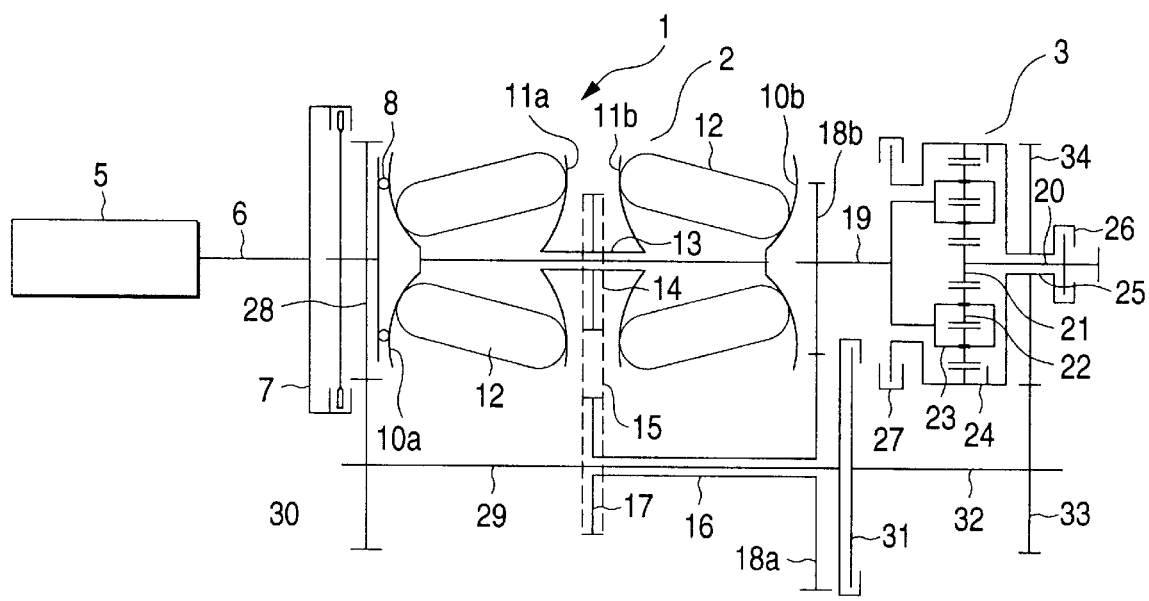
FIG. 1 is a system diagram showing a toroidal type continuous variable transmission system according to a first embodiment of the present invention.
Figure 2:
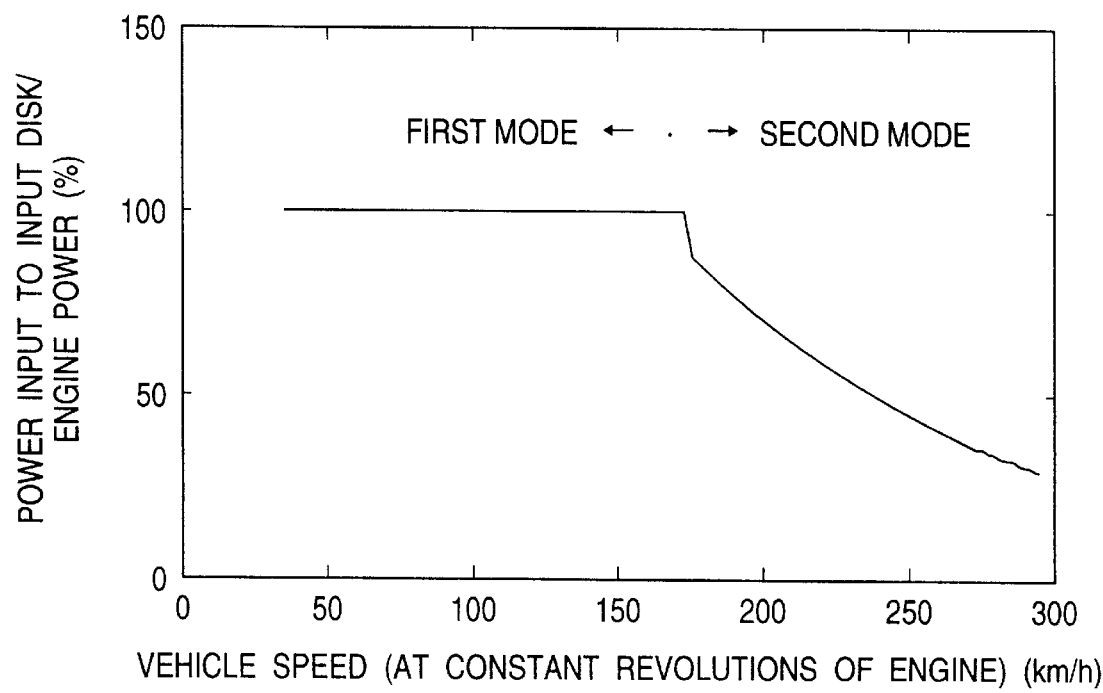
FIG. 2 is a graph showing the relationship between a vehicle speed and power input to an input disk/engine power according to the first embodiment.

FIGS. 1 and 2 show a toroidal type continuous variable transmission according to a first embodiment of the invention. FIG. 1 is a system diagram showing a double cavity toroidal type continuous variable transmission system according to a first embodiment of the present invention, and FIG. 2 is a graph showing the relationship between a vehicle speed and power input to an input disk/engine power according to the first embodiment. In FIG. 1, reference numeral 1 designates a toroidal type continuous variable transmission comprising a variator 2 and a planetary gear mechanism 3. The variator 2 is rotatably supported on a mount section by way of a bearing or the like and has an input shaft 6 which is connected at one end to a drive source 5 such as an engine.

A mechanical loading cam 8 serving as a mechanical pressing mechanism is provided on an input shaft 6 by way of a start clutch 7. Power is transmitted to the variator 2 by way of this mechanical loading cam 8. The variator 2 is provided with a pair of input disks 10a, 10b which are provided so as to oppose each other and rotate in association with the input shaft 6. A pair of output disks 11a, 11b are interposed in a concentric relationship with each other between the pair of input disks 10a, 10b in such a way as to have play with respect to the input shaft 6. The output disks 11a, 11b rotate in synchronous with each other.

A plurality of power rollers 12 are provided so as to freely rotate at an angle between the input disks 10a, 10b and the output disks 11a, 11b while remaining in contact with the disks. The output disks 11a, 11b are connected to the input shaft 6 by way of a loose-fit shaft 13 loosely fitted around the input shaft 6. In this variator 2, the torque transmitted to the input shaft 6 is transmitted to the loose-fit shaft 13 by way of the input disks 10a, 10b, the power rollers 12, and the output disks 11a, 11b. A speed ratio of the variator 2, that is, a value obtained by dividing the rotational speed of the output disks 11a, 11b by the rotational speed of the input disks 10a, 10b is determined by the tilt angle of the power roller 12.

More specifically, when the power rollers 12 are held in a horizontal state, the speed ratio assumes a neutral value of one. When the power rollers 12 are rotated at an angle in a direction in which the portions of the power rollers 12 facing the output disks 11a, 11b depart from the input shaft 6, the speed ratio also decreases so as to correspond to the inclination. Conversely, when the power rollers 12 are rotated at an angle in a direction in which the portions of the power rollers 12 facing the output disks 11a, 11b approach the input shaft 6, the speed ratio increases so as to correspond to the inclination. A first sprocket 14 is fitted around the loose-fit shaft 13 and is in association with the seconds sprocket 17 provided on the counter shaft 16 constituting the first power transmission mechanism, by way of a chain 15.

The counter shaft 16 is formed from a pipe and is connected at the other end to a first gear 18a. The first gear 18a meshes with a second gear 18b provided on a center shaft 19. In association with the planetary gear mechanism 3, the center shaft 19 constitutes a first power transmission mechanism.

The plantary gear mechanism 3 will now be described. The planetary gear mechanism 3 comprises a sun gear 21 having an output shaft 20, a plurality of planetary gears 22 meshing with the sun gear 21, carriers 23 connecting together the planetary gears 22, and a ring gear 24 meshing with the planetary gears 22. The ring gear 24 is connected to the center shaft 19. Further, a back clutch 27 is interposed between the ring gear 24 and a housing (not shown) of the planetary gear mechanism 3 and permits or constrains the rotation of the ring gear 24. Further, a low-speed clutch 26 is provided between the carriers 23 and the ring gear 24 for enabling or interrupting power transmission.

A third gear 28 is interposed between the start clutch 7 of the input shaft 6 and the mechanical loading cam 8, thus constituting a second power transmission mechanism. The third gear 28 meshes with a fourth gear 30 provided at one end of a bypass shaft 29. The bypass shaft 29 transmits power by bypassing the variator 2 and passes through the counter shaft 16. The bypass shaft 29 is connected at the other end to a transmission shaft 32 by way of a high-speed clutch 31. A fifth gear 33 is provided on this transmission shaft 32. The fifth gear 33 meshes with a sixth gear 34 of the casing 25 which rotates together with the ring gear 24 of the planetary gear mechanism 3.

The operation of the variable transmission system according to the first embodiment will now be described.

The input shaft 6 is currently in a stationary state, and the variator 2 is in the maximum decelerating position. Further, the high-speed clutch 31, the low-speed clutch 26, and the back clutch 27 are held in a released state. In the foregoing state, the rotation of the input shaft 6 in a predetermined direction is commenced by connection of the start clutch 7 and by means of the drive source 5, and the input disks 10a, 10b of the variator 2 rotate at the same rotational speed in the same direction as does the input shaft 6, in association with the rotation of the input shaft 6. Since the power rollers 12 are in the maximum decelerating position at this time, the rotation of the input disks 10a, 10b is transmitted to the output disks 11a, 11b by way of the power rollers 12, so as to produce rotation in the direction opposite to that in which the input disks 10a, 10b rotate and at a rotational speed slower than that of the input shaft 6.

Consequently, the loose-fit shaft 13 rotates, and power is transmitted to the first sprocket 14, the chain 15, and the second sprocket 17, whereby the first and second gears 18a, 18b also rotate by way of the counter shaft 16. However, in this state, the low-speed clutch 26 and the back clutch 27 are held in a released state, and the planet gears 22 and the carriers 23 merely rotate freely. The rotational force is not transmitted to the sun gear 21 connected to the output shaft 20, and the output shaft 20 is held in a stationary state.

In the state in which the output shaft 20 is in a stationary state, the start clutch 7 is connected, and the low-speed clutch 26 is also connected, thus releasing the high-speed clutch 31 and the back clutch 27. As a result, the ring gear 24 is brought into a connected state. The rotational force of the second gear 18b rotates the sun gear 21 by way of the planetary gears 22, whereby the rotational force is transmitted to the output shaft 20, thus effecting a first forward movement mode in which the output shaft 20 rotates in the same direction in which the input shaft 6 rotates.

While the first forward movement mode is maintained, the variator 2 is shifted toward a speeding-up side, that is, the power rollers 12 being rotated at an angle in a direction in which the portions of the power rollers 12 facing the output disks 11a, 11b approach the input shaft 6. The rotational speed of the counter shaft 16 increases in accordance with the inclined rotation of the power rollers 12. In association with an increase in the rotational speed of the counter shaft 16, the rotational speed of the planet gears 22 of the planet gear mechanism 3 is increased, and the rotational speed of the output shaft 20 is also increased, thus resulting in an increase in the speed ratio of the overall toroidal type continuous variable transmission system 1.

Next, the high-speed clutch 31 is connected to thereby release the low-speed clutch 26 and the back clutch 27. The start clutch 7 is then connected, whereby the rotation of the input shaft 6 is transmitted to the fourth gear 30 by way of the third gear 28 to thereby rotate the bypass shaft 29. The rotation of the bypass shaft 29 is transmitted to the transmission shaft 32 by way of the high-speed clutch 31, and the rotation of the transmission shaft 32 is transmitted to the ring gear 24 of the planetary gear mechanism 3 by way of the fifth and sixth gears 33, 34. The rotation of the ring gear 24 is transmitted to the sun gear 21 by way of the plurality of planetary gears 22, thus rotating the output shaft 20 connected to the sun gear 21.

Assuming that the carriers 23 supporting the planet gears 22 are in a standstill sate when the ring gear 24 is shifted to an input side, the speed is increased at a transmission gear ratio corresponding to a ratio of number of teeth of the ring gear 24 and the sun gear 21. The planetary gears 22 supported by the carriers 23 rotate around the sun gear 21, and the transmission gear ratio of the overall variable transmission system changes in accordance with the revolving speed of the planetary gears 22. For this reason, the transmission gear ratio of the overall variable transmission system can be adjusted, so long as the transmission gear ratio of the variator 2 is changed and the revolving speed of the planetary gears 22 is also changed.

More specifically, at the time of high-speed driving, the planetary gears 22 and the ring gear 24 revolve in the same direction. The faster the revolving speed of the planetary gears 22, the faster the rotational speed of the output shaft 20 fixed to the sun gear 21. For example, if the revolving speed and the rotational speed of the ring gear 24 (both of which are angular velocities) become equal to each other, the ring gear 24 becomes identical in rotational speed with the output shaft 20. If the revolving speed is slower than the rotational speed of the ring gear 24, the rotational speed of the output shaft 20 becomes faster than that of the ring gear 24. In contrast, if the revolving speed is faster than the rotational speed of the ring gear 24, the output shaft 20 becomes slower in rotational speed than the ring gear 24.

Accordingly, at the time of high-speed driving, as the transmission gear ratio of the variator 2 is changed to a decelerating side, the transmission gear ratio of the overall toroidal type continuous variable gear system 1 changes toward a speeding-up side. In such a high-speed driving condition, torque is applied to the variator 2 not from the input disks 10a, 10b but from the output disks 11a, 11b (providing that the torque applied to the variator at the time of low-speed driving is taken as positive torque, negative torque is applied to the variator). More specifically, while the high-speed clutch 31 is held in a connected state, the torque transmitted to the input shaft 6 from the drive source 5 is transmitted to the ring gear 24 of the planetary gear mechanism 3 by way of the second power transmission mechanism, i.e., the bypass shaft 29, before the mechanical loading cam 8 presses the input disk 10a. Consequently, substantially no torque is transmitted to the input disks 10a, 10b from the input shaft 6 by way of the mechanical loading cam 8.

Part of the torque transmitted to the ring gear 24 of the planetary gear mechanism 3 by way of the second power transmission mechanism is transmitted to the output disks 11a, 11b from the planetary gears 22 by way of the carriers 23 and the first power transmission mechanism. In this way, the circulating power torque applied to the variator 2 from the output disks 11a, 11b becomes smaller as the transmission gear ratio of the variator 2 is changed toward the decelerating side in order to shift the transmission gear ratio of the overall toroidal type continuous variable transmission system 1 toward the speeding-up side.

For example, provided that the circulating power torque applied to the variator 2 from the output disks 11a, 11b is 30%, the power rollers 12 press the mechanical loading cam 8 at 30% of power by way of the input disk 10a. At this time, although the mechanical loading mechanism 8 presses the input disk 10a at 100% of power, the third gear 28 is provided in front of the mechanical loading cam 8. Hence, the power is transmitted to the bypass shaft 29 from the third gear 28 by way of the fourth gear 30, and only 30% of power is transmitted to the mechanical loading cam 8. Accordingly, an excessive pressing force is not exerted on the variator 2, and appropriate thrust (propelling force) is obtained, thus improving transmission efficiency. As shown in FIG. 2, the torque input to the variator 2 is reduced at the time of high-speed driving, thus improving the durability of the constituent components of the variator 2.

Next, when the output shaft 20 is reversely rotated in order to move the automobile rearward, the low-speed clutch 26 and the high-speed clutch 31 are released, thus bringing the back clutch 27 into a connected state. As a result, the ring gear 24 of the planetary gear mechanism 3 is fixed, and the planetary gears 22 rotate/revolve around the sun gear 21 while meshing with the ring gear 24 and the sun gear 21. Accordingly, the sun gear 21 and the output shaft 20 connected to the sun gear 21 are rotated at the time of high-speed driving in the direction opposite to that in which they are rotated a the time of low-speed driving.

According to the foregoing first embodiment, appropriate thrust is produced, and the transmission efficiency is improved. Further, as a result of the bypass shaft 29 being passed through the counter shaft 16, a two-shaft configuration becomes feasible, thus rendering the overall variable transmission system compact.

Figure 3:
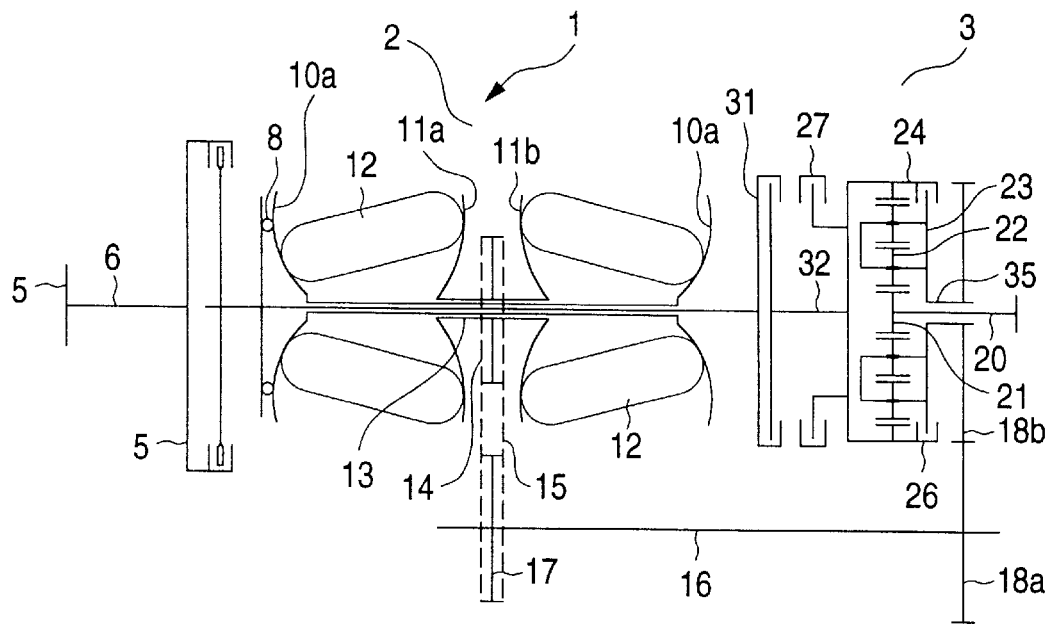
FIG. 3 is a system diagram showing a toroidal type continuous variable transmission system according to a second embodiment of the present invention.

FIG. 3 shows a second embodiment of the present invention. The elements which are identical with those of the first embodiment are assigned the same reference numerals, and their explanations will be omitted here. In the second embodiment, a first gear 18a is connected to the other end of the counter shaft 16 constituting the first power transmission mechanism. The first gear 18a meshes with a second gear 18b fitted around a loose-fit shaft 35 which rotates together with the carriers 23 of the planetary gear mechanism 3 in an integrated fashion In contrast, the bypass shaft 29_which is connected to the start clutch 7 of the input shaft 6 and constitutes the second power transmission mechanism_is passed through the mechanical loading cam 8 and the center of the variator 2 until it protrudes toward the planetary gear mechanism 3. The other end of the bypass shaft 29 is connected to the transmission shaft 32 by way of the high-speed clutch 31, and the transmission shaft 32 is connected to the ring gear 24. More specifically, the bypass shaft 29 passes through the mechanical loading cam 8 and the center of the variator 2, thus bypassing the variator 2. The torque input to the variator 2 at the time of high-speed driving is reduced, as in the case of the first embodiment. Therefore, the durability of the constituent elements of the variator 2 is improved. Further, the bypass shaft 29 passes through the variator 2, thus enabling a two-shaft configuration and rendering the overall variable transmission system compact.

Figure 4:
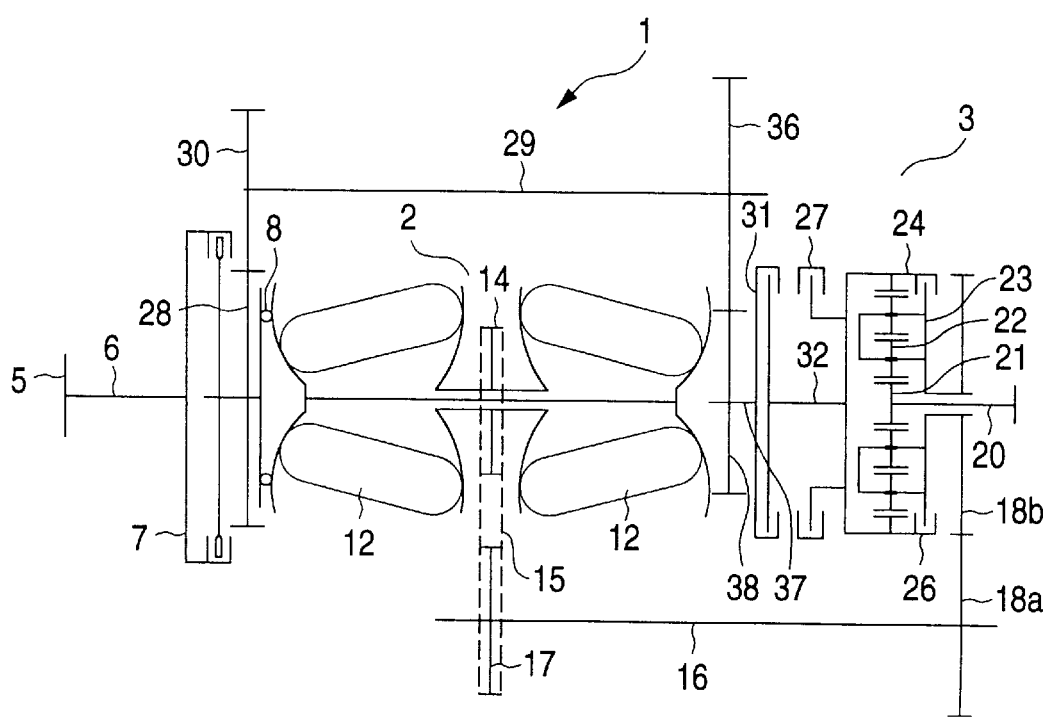
FIG. 4 is a system diagram showing a toroidal type continuous variable transmission system according to a third embodiment of the present invention.

FIG. 4 shows a third embodiment of the present invention. The elements which are the same as those described in the first and second embodiments are assigned the same reference numerals, and their explanations will be omitted here. In the third embodiment, the first gear 18a is connected to the other end of the counter shaft 16 constituting the first power transmission mechanism. The first gear 18a meshes with the second gear 18b fitted around the loose-fit shaft 35 which rotates together with the carriers 23 of the planetary gear mechanism 3 in an integrated fashion.

The third gear 28 constituting the second power transmission mechanism is provided between the start clutch 7 of the input shaft 6 and the mechanical loading cam 8. The third gear 28 is in mesh with the fourth gears 30 provided at one end of the bypass shaft 29. The bypass shaft 29 is provided outside the variator 2 in parallel with the center axis of the variator 2, and a fifth gear 36 is provided at the other end of the bypass shaft 29.

A center shaft 37 is provided between the variator 2 and the planetary gear mechanism 3, and a sixth gear 38 which meshes the fifth gear 36 is provided on the center shaft 37. The center shaft 37 is connected to the transmission shaft 32 by way of the high-speed clutch 31, and the transmission shaft 32 is connected to the ring gear 24. More specifically, the bypass shaft 29 passes outside the mechanical loading cam 8 and the variator 2, thus bypassing the variator 2. The torque input to the variator 2 at the time of high-speed driving is reduced, as in the case of the first and second embodiments. Accordingly, the durability of the constituent elements is improved.

Figure 5:
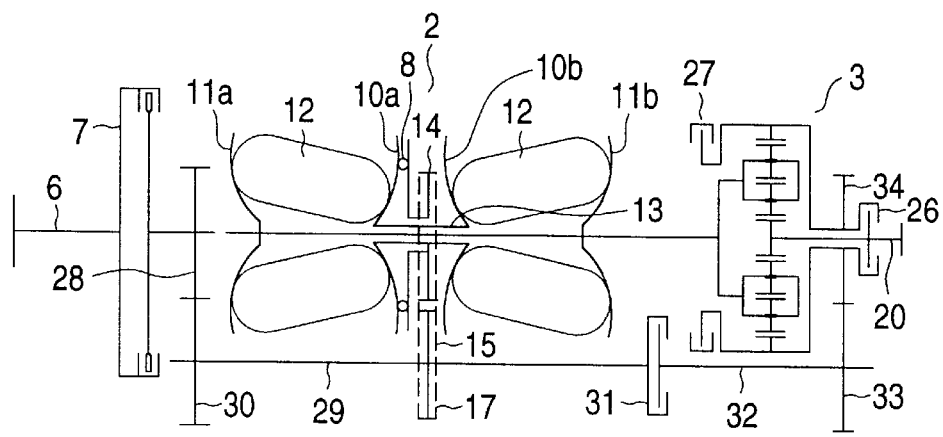
FIG. 5 is a system diagram showing a toroidal type continuous variable transmission system according to a fourth embodiment of the present invention.

FIG. 5 shows a fourth embodiment of the present invention. The elements which are the same as those described in the first embodiment are assigned the same reference numerals, and their explanations will be omitted here. The pair of input disks 10a, 10b are provided at the center of the variator 2 according to the fourth embodiment so as to face opposite directions. The pair of output disks 11a, 11b are provided on the outer sides of the variator 2 so as to oppose the input disks 10a, 10b. Further, the input disk 10a is provided with the mechanical loading cam 8.

The third gear 28 is provided on the input shaft 6, and the fourth gear 30 provided at one end of the bypass shaft 29 meshes with the third gear 28. The second sprocket 17 is provided at an intermediate position of the bypass shaft 29. The second sprocket 17 is in association with the first sprocket 14 provided on the loose-fit shaft 13 of the input disks 10a, 10b, by way of the chain 15. The other end of the bypass shaft 29 is connected to the transmission shaft 32 by way of the high-speed clutch 31, and the fifth gear 33 is provided on the transmission shaft 32. The fifth gear 33 is in mesh with the sixth gear 34 of the case 25 which rotates together with the ring gear 24 of the planetary gear mechanism 3 in an integrated fashion.

According to the fourth embodiment, the rotation of the input shaft 6 is transmitted to the bypass shaft 29 by way of the third and fourth gears 28, 29, and power is transmitted to the first sprocket 14 by way of the second sprocket 17 and the chain 15 in this order, thus rotating the input disks 10a, 10b.

Further, the configuration of the variable transmission system according to the fourth embodiment eliminates the counter shaft and bypasses the variator 2 by means of the bypass shaft 29 provided outside the variator 2. The torque input to the variator 2 at the time of high-speed driving is reduced, as in the case of the first embodiment. Accordingly, the durability of the constituent components of the variator 2 is improved. Further, elimination of the counter shaft enables a two-shaft configuration, thus rendering the overall variable transmission system compact.

Figure 6:
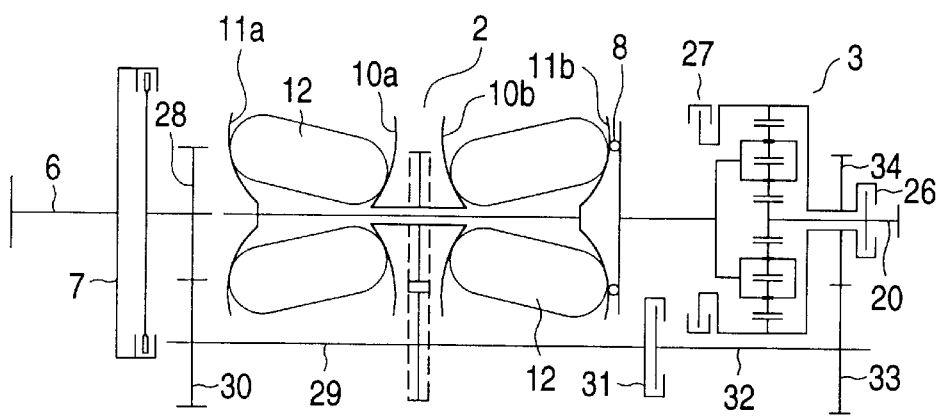
FIG. 6 is a system diagram showing a toroidal type continuous variable transmission system according to a fifth embodiment of the present invention.

FIG. 6 shows a fifth embodiment of the present invention. The elements which are the same as those described in the fourth embodiment are assigned the same reference numerals, and their explanations will be omitted here. The pair of input disks 10a, 10b are provided at the center of the variator 2 according to the fourth embodiment so as to face opposite directions. The pair of output disks 11a, 11b are provided on the outer sides of the variator 2 so as to oppose the input disks 10a, 10b. Further, the output disk 11b is provided with the mechanical loading cam 8, and power is transmitted in the same manner as in the case of the fourth embodiment, and hence its explanation will be omitted here.

Figure 7:
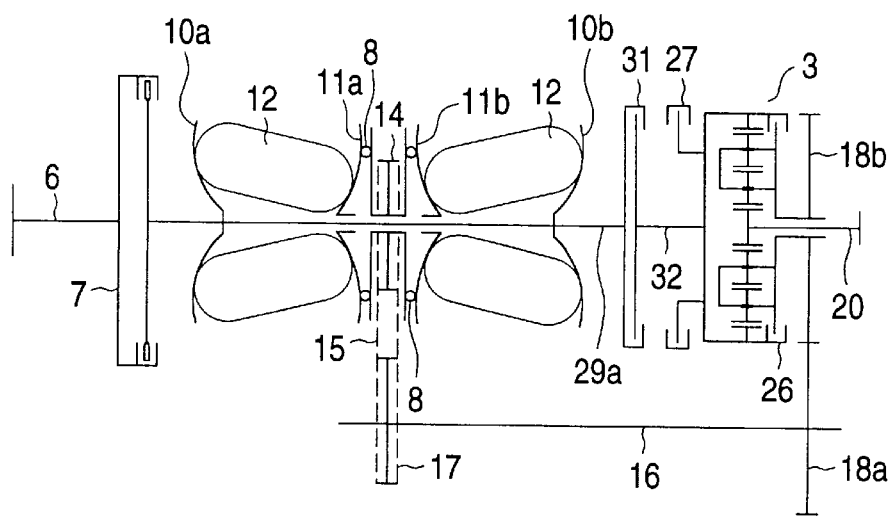
FIG. 7 is a system diagram showing a toroidal type continuous variable transmission system according to a sixth embodiment of the present invention.

FIG. 7 shows a sixth embodiment of the present invention. The elements which are the same as those described in the second embodiment are assigned the same reference numerals, and their explanations will be omitted here. The output disks 11a, 11b of the variator 2 according to the sixth embodiment are provided with the mechanical loading cam 8. The rotation of the output disks 11a, 11b is transmitted to the second sprocket 17 by way of the first sprocket 14 and the chain 15 in this order, thus rotating the counter shaft 16.

A power transmission shaft 29a passes through the variator 2 and protrudes toward the planetary gear mechanism 3. The other end of the power transmission shaft 29a is connected to the transmission shaft 32 by way of the high-speed clutch 31, and the transmission shaft 32 is connected to the ring gear 24. More specifically, the power transmission shaft 29a passes through the center of the variator 2, thus bypassing the variator 2.

Accordingly, the torque input to the variator 2 at the time of high-speed driving is reduced, as in the case of the first embodiment. The durability of the constituent components of the variator 2 is improved. Further, the power transmission shaft 29 passes through the variator 2, thus eliminating the bypass shaft, enabling a two-shaft configuration, and rendering the overall variable transmission system compact. Further, the output disks 11a, 11b are provided with the mechanical loading cam 8, and hence the torque which is identical to that input to the variator 2 is input to the mechanical loading cam 8, thus preventing an extremely large pressing force.

Figure 8:
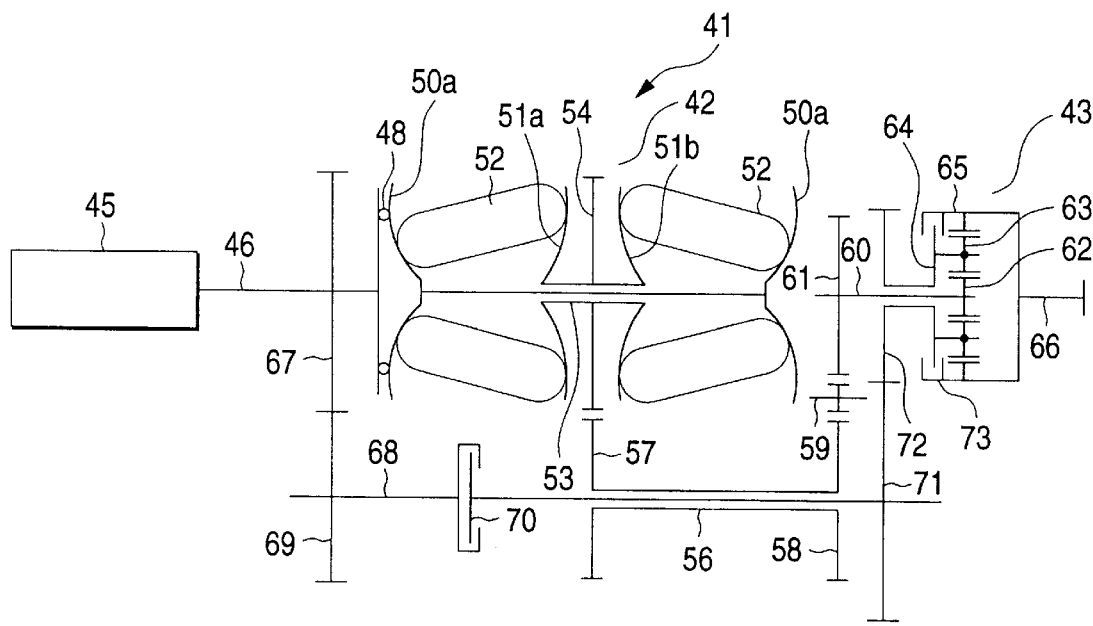
FIG. 8 is a system diagram showing a toroidal type continuous variable transmission system according to a seventh embodiment of the present invention.
Figure 9:
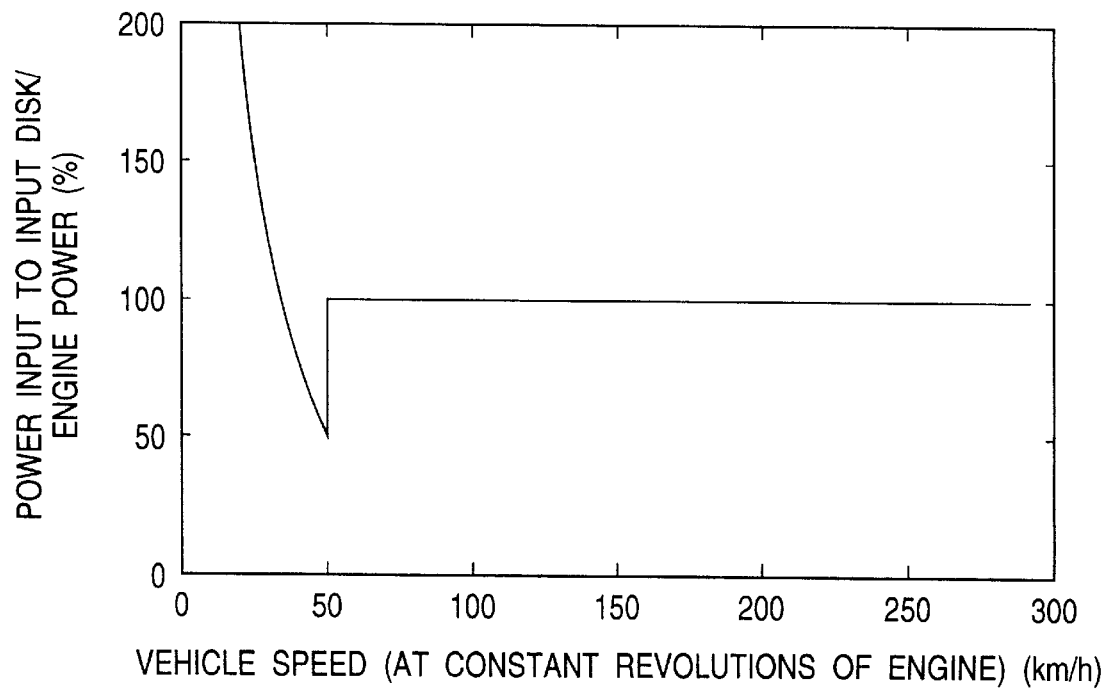
FIG. 9 is a graph showing the relationship between a vehicle speed and power input to an input disk/engine power according to the eighth embodiment.

FIGS. 8 and 9 show a seventh embodiment of the present invention, wherein a mechanical loading cam is used for a gear neutral system. As shown in FIG. 9, in a case where the torque of the input shaft actuated by the engine is transmitted to the variator by way of the mechanical loading cam, the torque smaller than the engine torque is input to the variator. In contrast, 100% of torque is input to the loading cam, thus preventing an excessively great pressing force.

In FIG. 8, reference numeral 41 designates a double cavity toroidal type continuous variable transmission system which comprises a verity 42 and a planetary gear mechanism 43. The variator 42 is rotatably supported on a mount by way of a bearing or the like and has an input shaft 46 connected at one end to a drive source 45, such as an engine.

The input shaft 46 is provided with a mechanical loading cam 48 as a mechanical loading mechanism. Power is transmitted to the variator 42 by way of this mechanical loading cam 48. The variator 42 is provided with a pair of input disks 50a, 50b which are provided so as to oppose each other and rotate in association with the input shaft 46. A pair of output disks 51a, 51b are interposed in a concentric relationship with each other between the pair of input disks 50a, 50b in such a way as to have play with respect to the input shaft 46. The output disks 51a, 51b rotate in synchronous with each other.

A plurality of power rollers 52 are provided so as to freely rotate at an angle between the input disks 50a, 50b and the output disks 51a, 51b while remaining in contact with the disks. The output disks 51a, 51b are connected to the input shaft 46 by way of a loose-fit shaft 53 loosely fitted around the input shaft 46. In this variator 42, the torque transmitted to the input shaft 46 is transmitted to the loose-fit shaft 53 by way of the input disks 50a, 50b, the power rollers 52, and the output disks 51a, 51b. A speed ratio of the variator 42, that is, a value obtained by dividing the rotational speed of the output disks 51a, 51b by the rotational speed of the input disks 50a, 50b is determined by the tilt angle of the power roller 52.

More specifically, when the power rollers 52 are held in a horizontal state, the speed ratio assumes a neutral value of one. When the power rollers 52 are rotated at an angle in a direction in which the portions of the power rollers 52 facing the output disks 51a, 51b depart from the input shaft 46, the speed ratio also decreases so as to correspond to the inclination. Conversely, when the power rollers 52 are rotated at an angle in a direction in which the portions of the power rollers 52 facing the output disks 51a, 51b approach the input shaft 46, the speed ratio increases so as to correspond to the inclination. A first sprocket 54 is fitted around the loose-fit shaft 53 and is in mesh with a second gear 57 provided on the counter shaft 56.

The counter shaft 56 is formed from a pipe and is connected at the other end to a third gear 58. The third gear 58 meshes with a fifth gear 61 provided along a center shaft 60 by way of a fourth gear 59 and is in association with the planetary gear mechanism 43.

The planetary gear mechanism 43 will now be described. The planetary gear mechanism 43 comprises a sun gear 62, a plurality of planetary gears 63 meshing with the sun gear 62, carriers 64 connecting together the planetary gears 63, and a ring gear 65 meshing with the planetary gears 63. The sun gear 62 is connected to the center shaft 60, and the ring gear 65 is connected to the output shaft 66.

On the input shaft 46, there is provided a sixth gear 67 at a position closer to the drive source (or on the input side) with reference to the mechanical loading cam 48. The sixth gear 67 is in mesh with a seventh gear 69 provided at one end of the bypass shaft 68. The bypass shaft 68 transmits power by bypassing the variator 42 and passes through the counter shaft 56. A low-speed clutch 70 is provided at some position on the bypass shaft 68, and an eight gear 71 is provided at the other end of the bypass shaft 68. The eighth gear 71 is in mesh with the ninth gear 72 connected to the carriers 64. A high-speed clutch 73 is interposed between the carriers 64 and the ring gear 65 for enabling or interrupting power transmission.

According to the seventh embodiment, in a state in which the low-speed clutch 70 is in a connected state, before the mechanical loading cam 48 presses the input disk 50a, the torque transmitted to the input shaft 46 from the drive source 45 is transmitted to the carriers 64 of the planetary gear mechanism 43, by way of the bypass shaft 68 serving as the second power transmission mechanism. Accordingly, 100% of torque is not transmitted to the input disks 50a, 50b from the input shaft 46 by way of the mechanical loading cam 48, thus preventing an excessive pressing force.

Part of the torque transmitted to the carriers 64 of the planetary gear mechanism 43 by way of the bypass shaft 68 is transmitted to the output disks 51a, 51b from the sun gear 62 by way of the first power transmission mechanism. In this way, the circulating power torque applied to the variator 42 from the output disks 51a, 51b becomes smaller as the transmission gear ratio of the variator 42 is changed toward the decelerating side in order to shift the transmission gear ratio of the overall toroidal type continuous variable transmission system 1 toward the speeding-up side. As a result, the torque input to the variator 42 at the time of low-speed driving is reduced, and the durability of the constituent elements of the variator 42 is improved.

Figure 10:
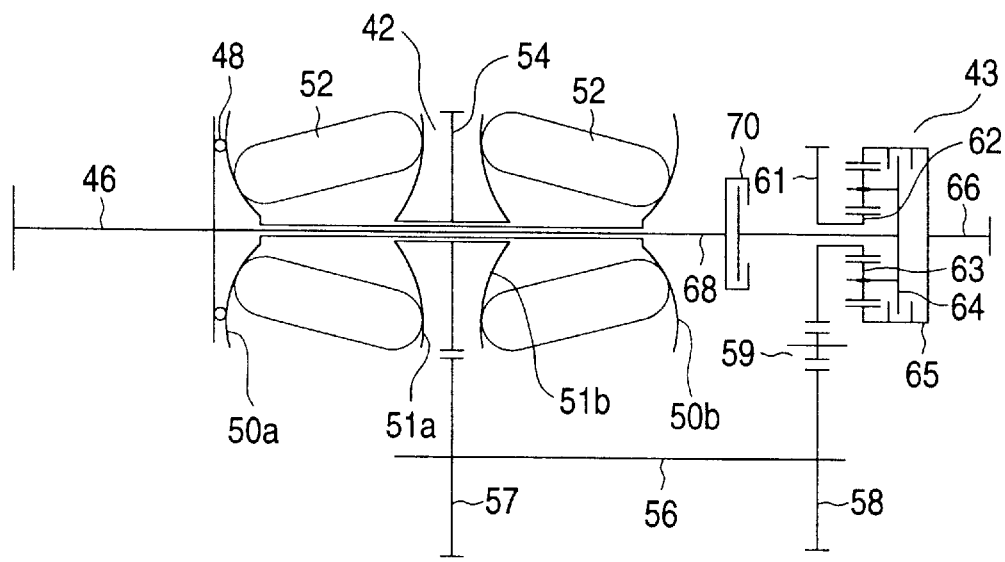
FIG. 10 is a system diagram showing a toroidal type continuous variable transmission system according to an eighth embodiment of the present invention.

FIG. 10 shows an eight embodiment of the present invention. The elements which are the same as those described in the seventh embodiment are assigned the same reference numerals, and their explanations will be omitted here. In the eighth embodiment, the third gear 58 is connected to the other end of the counter shaft 56 constituting the first power transmission mechanism. The third gear 58 is connected to the sun gear 62 of the planetary gear mechanism 43 by way of the fourth and fifth gears 59 and 61.

The bypass shaft 68__which is connected to the input shaft 46 and constitutes the second power transmission mechanism passes through the mechanical loading cam 48 and the center of the variator 42 and protrudes toward the planetary gear mechanism 43. The other end of the bypass shaft 68 is connected to the ring gear 64 by way of the low-speed clutch 70. More specifically, the bypass shaft 68 passes through the mechanical loading cam 48 and the center of the variator 42, thus bypassing the variator 42. As a result, the torque input to the variator 42 at the time of low-speed driving is reduced, as in the case of the seventh embodiment, and the durability of the constituent elements of the variator 42 is improved. Further, the bypass shaft 68 passing through the variator 42 enables a two-shaft configuration, thus rendering the overall variable transmission system compact.

Figure 11:
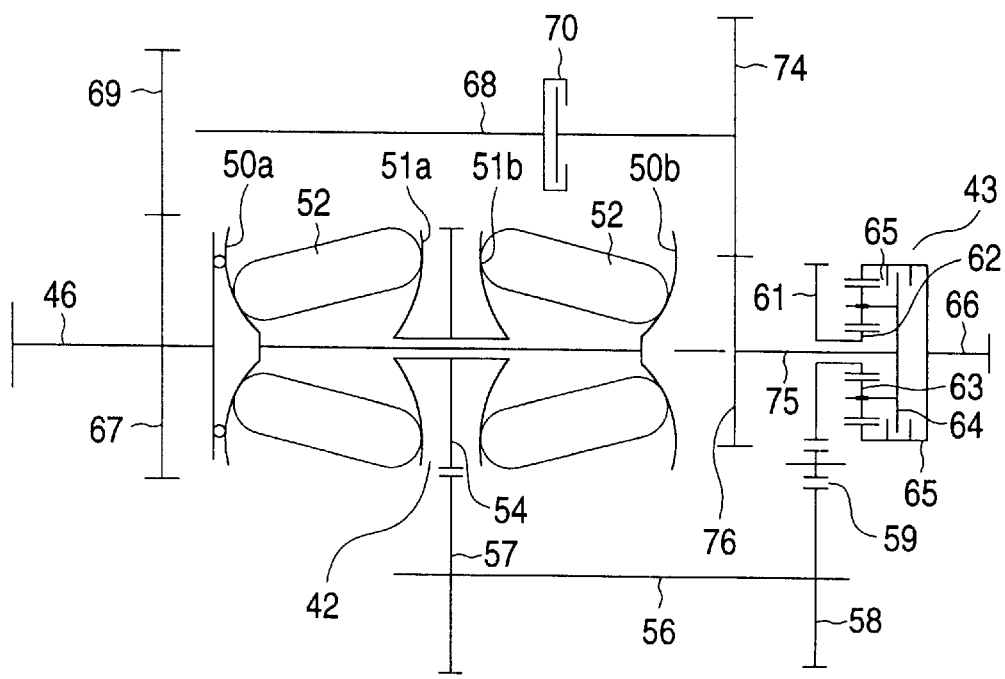
FIG. 11 is a system diagram showing a toroidal type continuous variable transmission system according to a ninth embodiment of the present invention.

FIG. 11 shows a ninth embodiment of the present invention. The elements which are the same as those described in the seventh embodiment are assigned the same reference numerals, and their explanations will be omitted here. In the ninth embodiment, the third gear 58 is connected to the other end of the counter shaft 56 constituting the first power transmission mechanism. The third gear 58 is connected to the sun gear 62 of the planetary gear mechanism 43 by way of the fourth and fifth gears 59 and 61.

A sixth gear 67 constituting a second power transmission mechanism is provided on the input side of the mechanical loading cam 48 of the input shaft 46. The sixth gear 67 is in mesh with a seventh gear 69 provided at one end of the bypass shaft 68. The bypass shaft 68 is provided outside the variator 42 in parallel with the center axis of the variator 42. A low-speed clutch 70 is provided at some point on the bypass shaft 68, and an eighth gear 74 is provided on the other end of the bypass shaft 68.

A center shaft 75 is provided between the variator 42 and the planetary gear mechanism 43, and a ninth gear 76 which meshes with the eight gear 74 is provided on the center shaft 75. The center shaft 75 is connected to the carrier 64. More specifically, the bypass shaft 68 passes outside the mechanical loading cam 48 and the variator 42, thus bypassing the variator 42. As a result, the torque input to the variator 42 at the time of low-speed driving is reduced, as in the case of the seventh and eighth embodiments, and the durability of the constituent elements of the variator 42 is improved.

Figure 12:
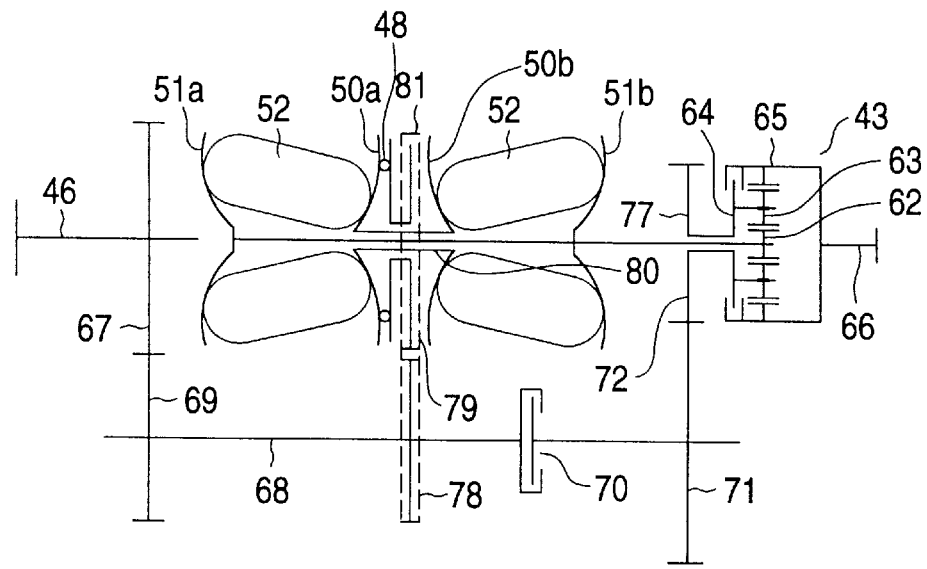
FIG. 12 is a system diagram showing a toroidal type continuous variable transmission system according to a tenth embodiment of the present invention.

FIG. 12 shows a tenth embodiment of the present invention. The elements which are the same as those described in the seventh embodiment are assigned the same reference numerals, and their explanations will be omitted here. The pair of input disks 50a, 50b are provided at the center of the variator 42 according to the tenth embodiment so as to face opposite directions. The pair of output disks 51a, 51b are provided on the outer sides of the variator 42 so as to oppose the input disks 50a, 50b. Further, the input disk 50a is provided with the mechanical loading cam 48. A center axis 77 connecting together the pair of output disks 51a, 51b protrudes from the variator 42 and is connected to the sun gear 62 of the sun gear mechanism 43.

The sixth gear 67 is provided on the input shaft 46 and is in mesh with the seventh gear 69 provided at one end of the bypass shaft 68. The second sprocket 78 is provided an intermediate position on the bypass shaft 68 and is in association with the first sprocket 81 provided on a loose-fit shaft 80 of the input disks 50a, 50b, by way of a chain 79. The low-speed clutch 70 is provided at some point on the bypass shaft 68, and the eighth gear 71 is provided on the other end of the bypass shaft 68. A ninth gear 72 is in mesh with the eight gear 71 and is connected to the carriers 64 of the planetary gear mechanism 43.

According to the tenth embodiment, the rotation of the input shaft 46 is transmitted to the bypass shaft 69 by way of the sixth and seventh gears 67, 69, and power is transmitted to the first sprocket 81 by way of the second sprocket 78 and the chain 79 in this order, thus rotating the input disks 50a, 50b.

Further, the configuration of the variable transmission system according to the tenth embodiment eliminates the counter shaft and bypasses the variator 42 by means of the bypass shaft 68 provided outside the variator 42. The torque input to the variator 42 at the time of low-speed driving is reduced, as in the case of the seventh embodiment. Accordingly, the durability of the constituent components of the variator 42 is improved. Further, elimination of the counter shaft enables a two-shaft configuration, thus rendering the overall variable transmission system compact.

Figure 13:
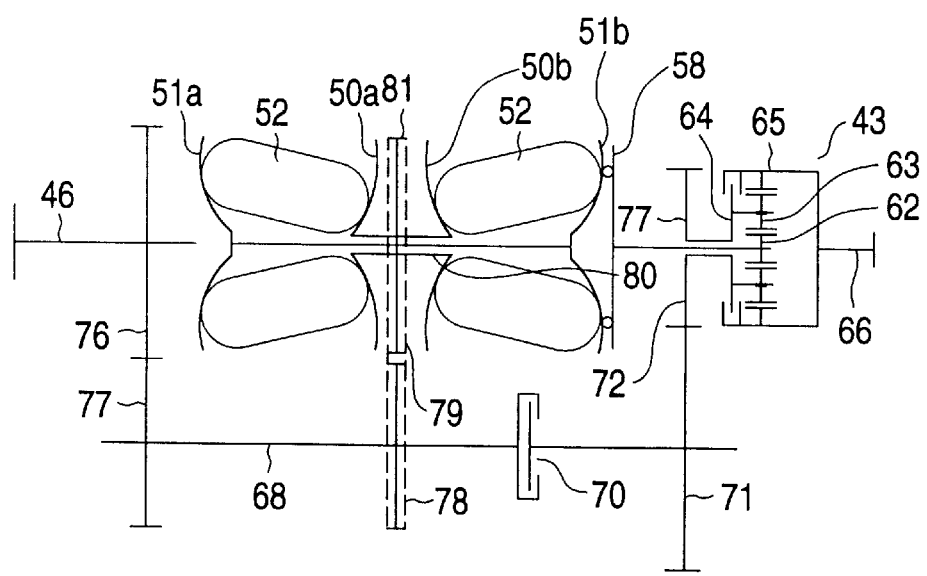
FIG. 13 is a system diagram showing a toroidal type continuous variable transmission system according to an eleventh embodiment of the present invention.

FIG. 13 shows an eleventh embodiment of the present invention. The elements which are the same as those described in the tenth embodiment are assigned the same reference numerals, and their explanations will be omitted here. Even in the present embodiment, the pair of input disks 50a, 50b are provided at the center of the variator 42 so as to face opposite directions. The pair of output disks 51a, 51b are provided on the outer sides of the variator 42 so as to oppose the input disks 50a, 50b. Further, the output disk 51b is provided with the mechanical loading cam 48, and power is transmitted in the same manner as in the case of the tenth embodiment, and hence its explanation will be omitted here.

Figure 14:
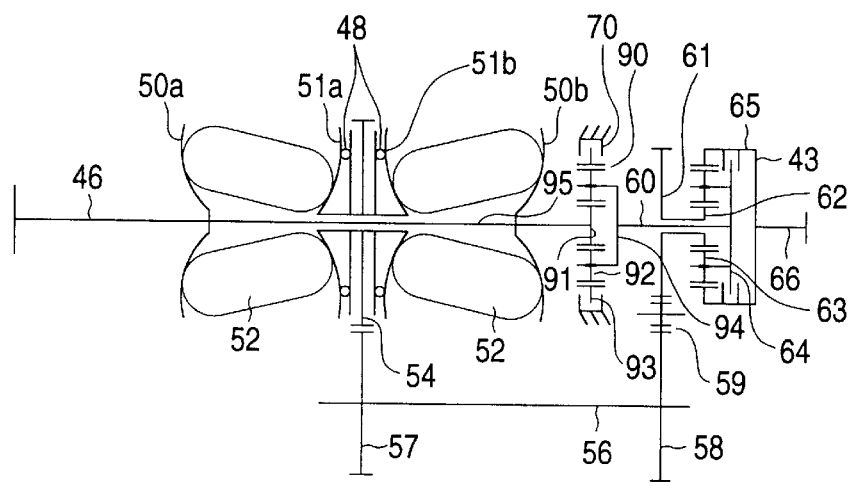
FIG. 14 is a system diagram showing a toroidal type continuous variable transmission system according to a twelfth embodiment of the present invention.

FIG. 14 shows a twelfth embodiment of the present invention. The elements which are the same as those described in the eighth embodiment are assigned the same reference numerals, and their explanations will be omitted here. The output disks 51a, 51b of the variator 42 according to the twelfth embodiment are provided with the mechanical loading cam 48. The rotation of the output disks 51a, 51b is transmitted to the first gear 54 and the second gear 57 in order, thus rotating the counter shaft 56.

A power transmission shaft 95 passes through the variator 42 and protrudes toward the planetary gear mechanism 43. The other end of the power transmission shaft 95 is provided with a sun gear 91 of a decelerating planetary gear set 90. A ring gear 93 is provided around the sun gear 91 by way of planetary gears 92, and the low-speed clutch 70 is provided between the ring gear 93 and a mount such as a casing. The carrier 94 supporting the planetary gear 92 is connected to the center shaft 60 which is connected to the sun gear 62 of the sun planet gear mechanism 43. More specifically, the power transmission shaft 95 passing through the center of the variator 42, thus bypassing the variator 42.

Accordingly, the torque input to the variator 42 at the time of low-speed driving is reduced, as in the case of the eighth embodiment. Accordingly, the durability of the constituent components of the variator 42 is improved. Further, the power transmission shaft 95 passes through the variator 42, thus eliminating the bypass counter shaft 68 (as utilized in the eighth embodiment shown in FIG. 10), enabling a two-shaft configuration, and rendering the overall variable transmission system compact. Further, by virtue of the mechanical loading cam 48 being provided on the output disks 51a, 51b, the torque which is the same as that input to the variator 42 is input to the loading cam 48, thereby preventing an excessive pressing force.

Figure 15:
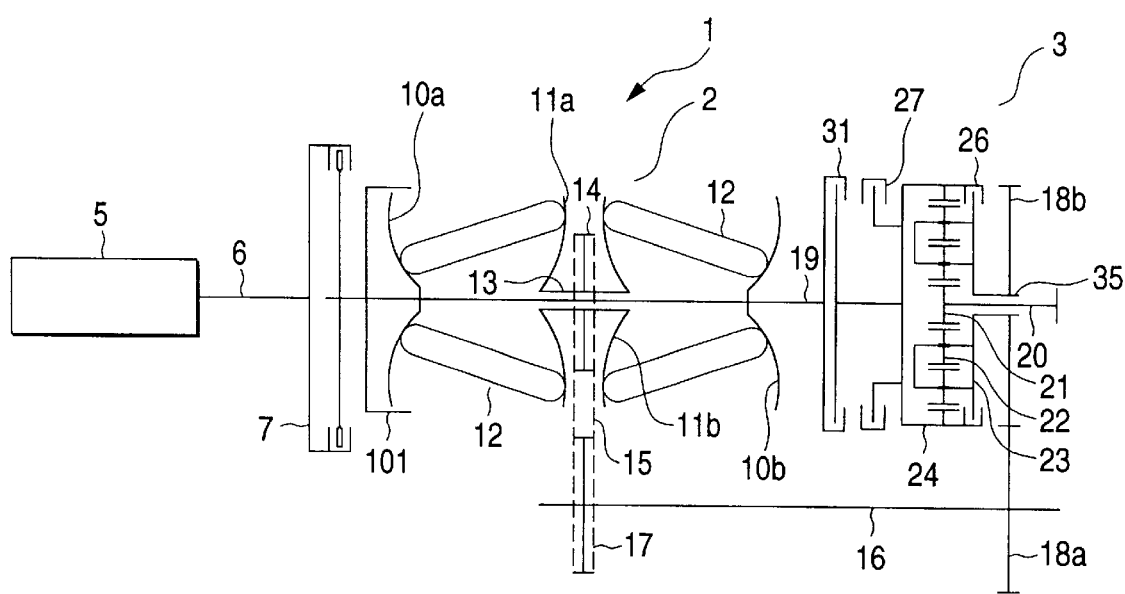
FIG. 15 is a system diagram showing a toroidal type continuous variable transmission system according to a thirteenth embodiment of the present invention.

FIG. 15 is a system diagram showing a double cavity toroidal type continuous variable transmission according to a thirteenth embodiment of the present invention. The constituent elements which are the same as those of the first embodiment are assigned the same reference numerals, and their explanations will be omitted here.

The input shaft 6 is provided with a hydraulic piston 101 serving as a hydraulic pressing mechanism, by way of the start clutch 7. The hydraulic piston 101 is connected to a hydraulic pressure source (not shown) and is able to transmit arbitrary pressing force to the variator 2. The center shaft 19 is connected to the other end of the input shaft 6, by way of a high-speed clutch 31, and the center shaft 19 constitutes the second power transmission mechanism in association with the planetary gear mechanism 3.

The planetary gear mechanism 3 will now be described. The planetary gear mechanism 3 comprises the sun gear 21 having the output shaft 20, the plurality of planetary gears 22 meshing with the sun gear 21, the carriers 23 connecting together the planetary gears 22, and the ring gear 24 meshing with the planetary gears 22. The ring gear 24 is connected to a high-speed clutch 31 by way of the center shaft 19. Further, the back clutch 27 is interposed between the ring gear 24 and the housing (not shown) of the planetary gear mechanism 3 and permits or constrains the rotation of the ring gear 24. Further, the low-speed clutch 26 is provided between the carriers 23 and the ring gear 24 for enabling or interrupting power transmission.

The first gear 18a is provided on the other end of the counter shaft 1 constituting the first power transmission mechanism. The carriers 23 of the planetary gear mechanism 3 is provided with the loose-fit shaft 35 which loosely fits around the output shafts 20. The second gear 18b meshing with the first gear 18a is provided on the loose-fit shaft 35.

The operation of the variable transmission system according to the thirteen embodiment will now be described, and explanations of the operations which are the same as those in the first embodiment will be omitted here.

In the state in which the output shaft 20 is in a stationary state, the start clutch 7 is brought into a connected state, and the low-speed clutch 26 is also brought into a connected state, thus releasing the high-speed clutch 31 and the back clutch 27. As a result, the carriers 23 are coupled to the ring gear 24, and the rotational force of the second gear 18b is transmitted to the loose-fit shaft 28, the carriers 23, and the ring gear 24. Accordingly, the sun gear 21 is rotated by way of the planetary gears 22, and the resultant torque is transmitted to the output shaft 20, thus realizing a first forward movement mode in which the output shaft 20 rotates in the same direction in which the input shaft 6 rotates.

While the first forward movement mode is maintained, the variator 2 is shifted toward a speeding-up side, that is, the power rollers 12 being rotated at an angle in a direction in which the portions of the power rollers 12 facing the output disks 11a, 11b approach the input shaft 6, the rotational speed of the counter shaft 16 increases in accordance with the inclined rotation of the power rollers 12. In association with an increase in the rotational speed of the counter shaft 16, the rotational speed of the ring gear 24 and carriers 23 of the planet gear mechanism 3 is increased, and the rotational speed of the output shaft 20 is also increased, thus resulting in an increase in the speed ratio of the overall toroidal type continuous variable transmission system 1.

Next, the high-speed clutch 31 is connected to thereby release the low-speed clutch 26 and the back clutch 27. The start clutch 7 is then connected, whereby the rotation of the input shaft 6 is transmitted to the center shaft 19 by way of the high-speed clutch 18. The rotation of the ring gear 24 is transmitted to the sun gear 21 by way of the plurality of planetary gears 22, thereby rotating the output shaft 20 connected to the sun shaft 21. Assuming that the carriers 23 supporting the planet gears 22 are in a standstill sate when the ring gear 24 is shifted to an input side, the speed is increased at a transmission gear ratio corresponding to a ratio of number of teeth of the ring gear 24 and the sun gear 21. The planetary gears 22 supported by the carriers 23 rotate around the sun gear 21, and the transmission gear ratio of the overall variable transmission system changes in accordance with the revolving speed of the planetary gears 22. For this reason, the transmission gear ratio of the overall variable transmission system can be adjusted, so long as the transmission gear ratio of the variator 2 is changed and the revolving speed of the planetary gears 22 is also changed.

Namely, at the time of high-speed driving, the planetary gears 22 and the ring gear 24 rotate in the same direction. The faster the revolving speed of the planetary gears 22, the faster the rotational speed of the output shaft 20 fixed to the sun gear 21. For example, if the revolving speed and the rotational speed of the ring gear 24 (both of which are angular velocities) become equal to each other, the ring gear 24 becomes identical in rotational speed with the output shaft 20. If the revolving speed is slower than the rotational speed of the ring gear 24, the rotational speed of the output shaft 20 becomes faster than that of the ring gear 24. In contrast, if the revolving speed is faster than the rotational speed of the ring gear 24, the output shaft 20 becomes slower in rotational speed than the ring gear 24.

Accordingly, at the time of high-speed driving, part of the torque transmitted to the ring gear 24 of the planetary gear mechanism 3 by way of the second power transmission mechanism is transmitted to the output disks 11a, 11b from the planetary gears 22 by way of the carriers 23 and the first power transmission mechanism. As the transmission gear ratio of the variator 2 is shifted toward the decelerating side, the transmission gear ratio of the overall toroidal type continuous variable transmission system 1 changes toward the speeding-up side.

In such a high-speed driving condition, there arises what is called a power circulating state in which torque is applied to the variation 2 not from the input disks 10a, 10b but from the output disks 11a, 11b. For example, provided that the torque exerted from the input disks 10a, 10b is 30%, the pressing force can be changed by adoption of the hydraulic piston 8. Accordingly, it is only required that the pressing pressure should be applied to the input disks 10a, 10b at 30% of power by means of the hydraulic piston 8. The power input to the variator 2 is reduced, enabling a reduction in the load exerted on the variator 2. As shown in FIG. 2, the torque input to the variator 2 is reduced at the time of high-speed driving, thus improving the durability of the constituent components of the variator 2.

Figure 16:
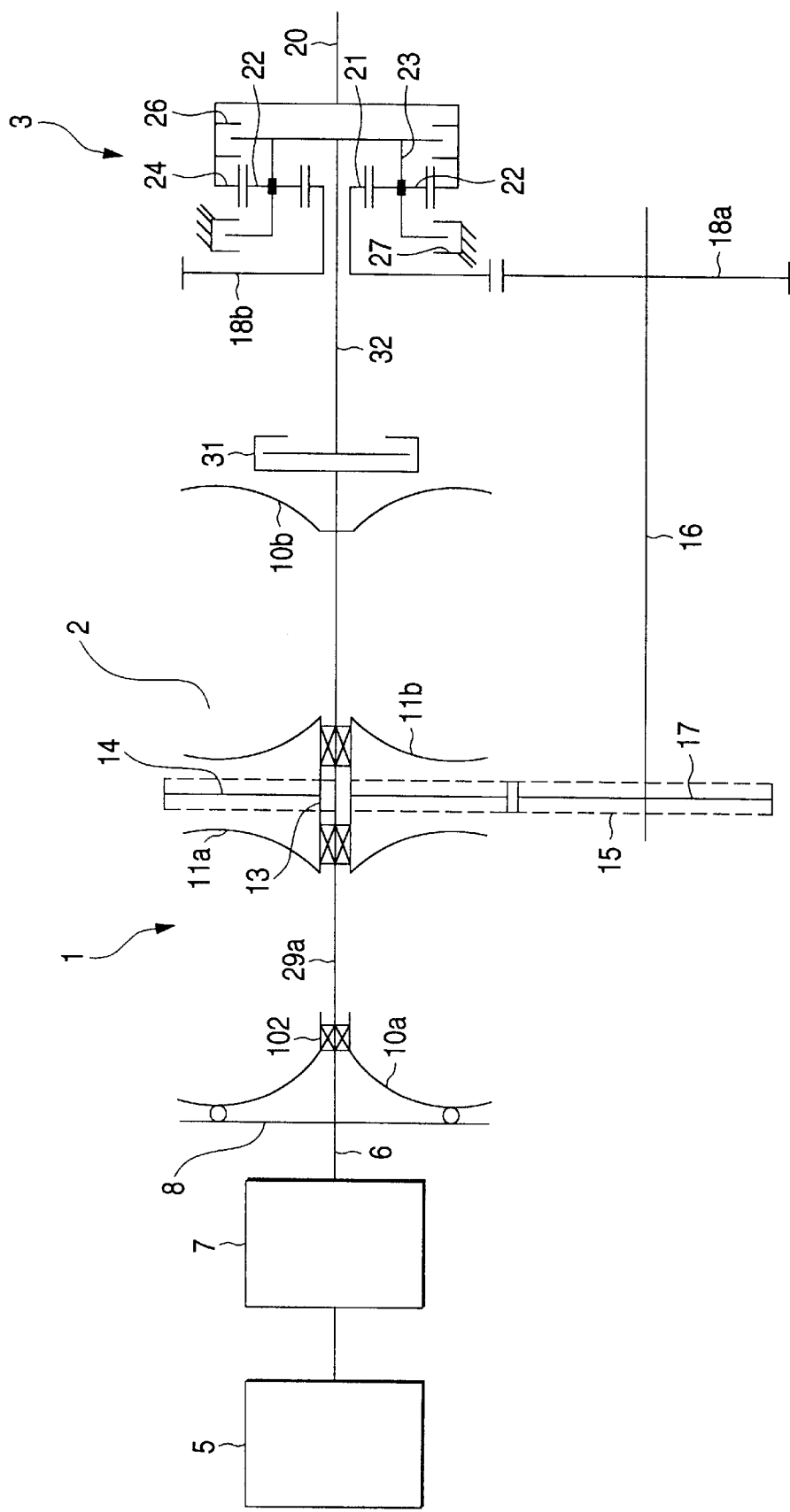
FIG. 16 is a system diagram showing a toroidal type continuous variable transmission according to a fourteenth embodiment of the present invention.

FIG. 16 shows a fourteenth embodiment of the present invention. A variable transmission system according to the fourteenth embodiment is characterized by a structure for adjusting the magnitude of the force required by the loading cam 8 to press the input disk 10a (provided on the left side in FIG. 16) against the input disk 10b (provided on the right side in FIG. 16) to the magnitude of torque transmitted by way of the input disks 10a, 10b, non-illustrated power rollers, and the output disks 11a, 11b. In other respects, the transmission system according to the present embodiment is identical in operation and structure with the variable transmission systems described in the previous embodiments. The elements which are the same as those in the previous embodiments are assigned the same reference numerals, and repetition of their explanations will be omitted or simplified here. The following descriptions is chiefly given of the characteristics of the present embodiment.

The input shaft 6 and a power transmission shaft 29a are integrally connected together so as to rotate in synchronous with each other. More specifically, the input shaft 6 and the power transmission shaft 29a are formed into one single shaft. These shafts are provided so as to be rotatable in synchronous with each other. To constitute a double cavity toroidal type continuous variable transmission 1, of the pair of input disks 10a, 10b provided at both ends of the power transmission shaft 29a, the input disk 10a located close to the loading cam 8 (provided on the left side in FIG. 16) is supported in the vicinity of one end of the power transmission shaft 29a (i.e., the left end shown in FIG. 16) by means of a bearing 102, such as a radial shaft bearing, which permits rotation or axial displacement. Accordingly, the input disk 10a located close to the loading cam 8 is supported in the vicinity of one end of the power transmission shaft 29a so as to be rotatable or axially displaceable. The input disk 10a provided nearby the loading cam 6 is rotated by way of the loading cam 8 in association with the rotation of the input shaft 6 and the power transmission shaft 29a.

In contrast, the input disk 10b spaced away from the loading cam 8 (i.e., on the right side in FIG. 16) is provided on the other end of the power transmission shaft 29a by means of fixation or spline engagement so as to be rotatable in synchronous with the power transmission shaft 29a. Accordingly, the input disk 10b spaced away from the loading cam 8 rotates in synchronous with the input shaft 6.

In the case of the variable transmission system according to the present embodiment, the input disk 10a located close to the loading cam 8 is rotatable in association with the rotation of the input shaft 6 by way of the loading cam 8. For this reason, the magnitude of the force required by the loading cam 8 to press the input disk 10a becomes equal to the magnitude of the torque transmitted by way of the input disks 10a, 10b, the non-illustrated power rollers, and the output disks 11a, 11b, all of which constitute the toroidal type continuous variable transmission system 1. For example, while the high-speed clutch 31 and the back clutch 27 are brought into a disconnected state and while the low-speed clutch 26 is in a connected state, the variable transmission system is operated, the torque output from the drive source 5 is transmitted to the input disks 10a, 10b, the non-illustrated power rollers, and the output disks 11a, 11b, all of which constitute the toroidal type continuous variable transmission system 1. In this case, the loading cam 8 presses the input disk 10a provided nearby the loading cam 8 toward the input disk 10b spaced away from the loading cam 8 with the force corresponding to the output torque. The same applies to the case where the variable transmission system is operated while the high-speed clutch 31 and the low-speed clutch 26 are brought into a disconnected state and while the back clutch 27 is in a connected state.

In contrast, while the low-speed clutch 26 and the back clutch 27 are brought into a disconnected state and while the high-speed clutch 31 is in a connected state, the variable transmission system is operated, torque smaller than the torque output from the drive source 5 is transmitted to the input disks 10a, 10b, the non-illustrated power rollers, and the output disks 11a, 11b, all of which constitute the toroidal type continuous variable transmission system 1. In this case, the loading cam 8 presses the input disk 10a provided nearby the loading cam 8 toward the input disk 10b spaced away from the loading cam 8 with the force corresponding to the torque smaller than the output torque. Accordingly, in any case, the contact pressure between the internal surfaces of the input and output disks 10a, 10b, 11a, and 11b and the circumferential surfaces of the power rollers can be maintained appropriately, thus preventing the contact pressure exerted on the surface of these disks and rollers from becoming excessive or slippage from arising in the surface contact area between the disks and the rollers.

Figure 17:
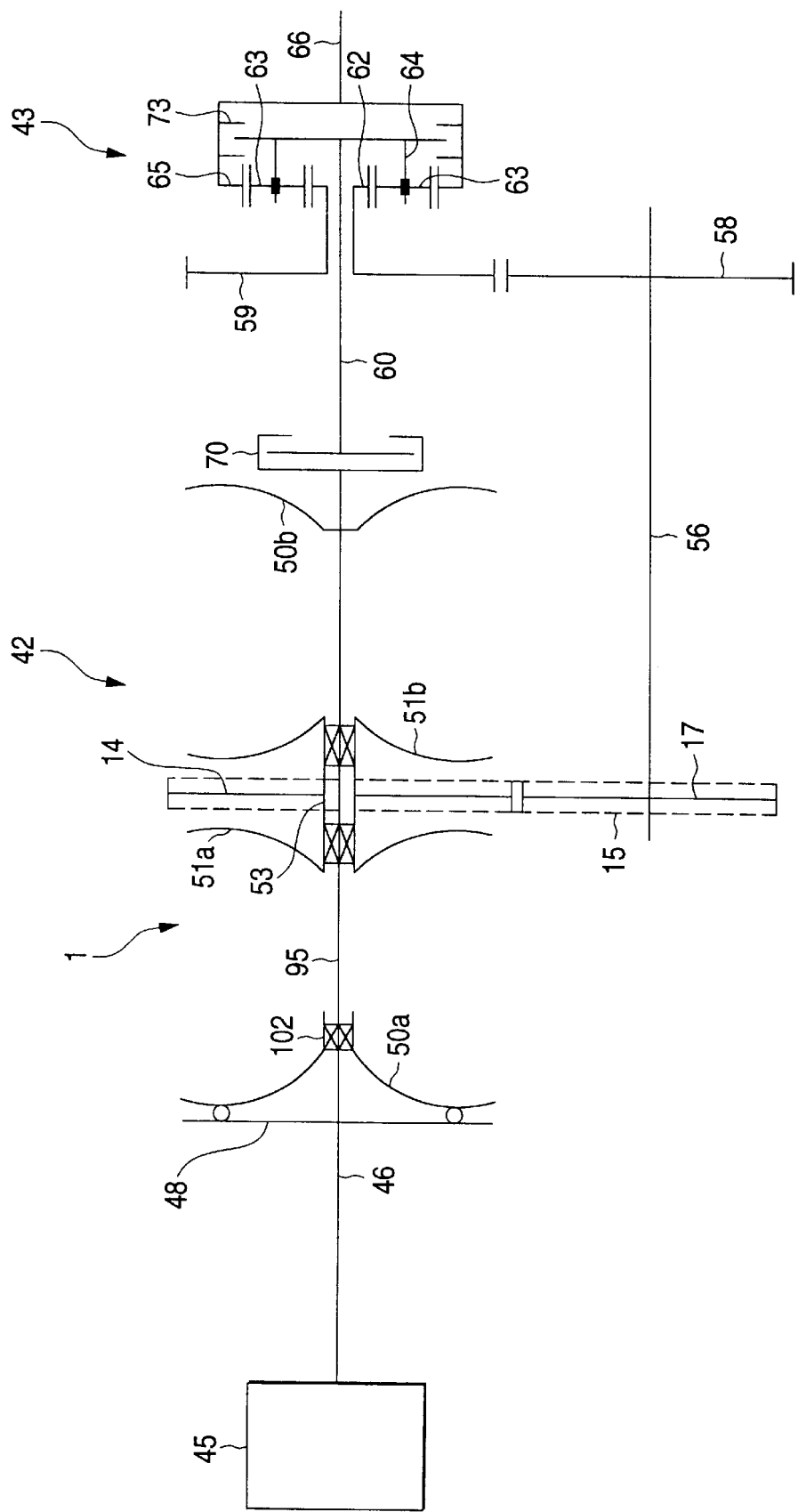
FIG. 17 is a system diagram showing a toroidal type continuous variable transmission according to a fifteenth embodiment of the present invention.

FIG. 17 shows a fifteenth embodiment of the present invention. The present embodiment is a modification of the previous embodiment. In terms of operation and configuration, a variable transmission system is identical with that described in the previous embodiment and adjusts the magnitude of the force required by a loading cam 48 to press an input disk 50a (provided on the left side in FIG. 17) against an input disk 50b (provided on the right side in FIG. 17) to the magnitude of torque transmitted by way of the input disks 50a, 50b, non-illustrated power rollers, and output disks 51a, 51b. Therefore, the elements which are the same as those in the previous embodiment are assigned the same reference numerals, and repetition of their explanations will be omitted here.

Figure 18:
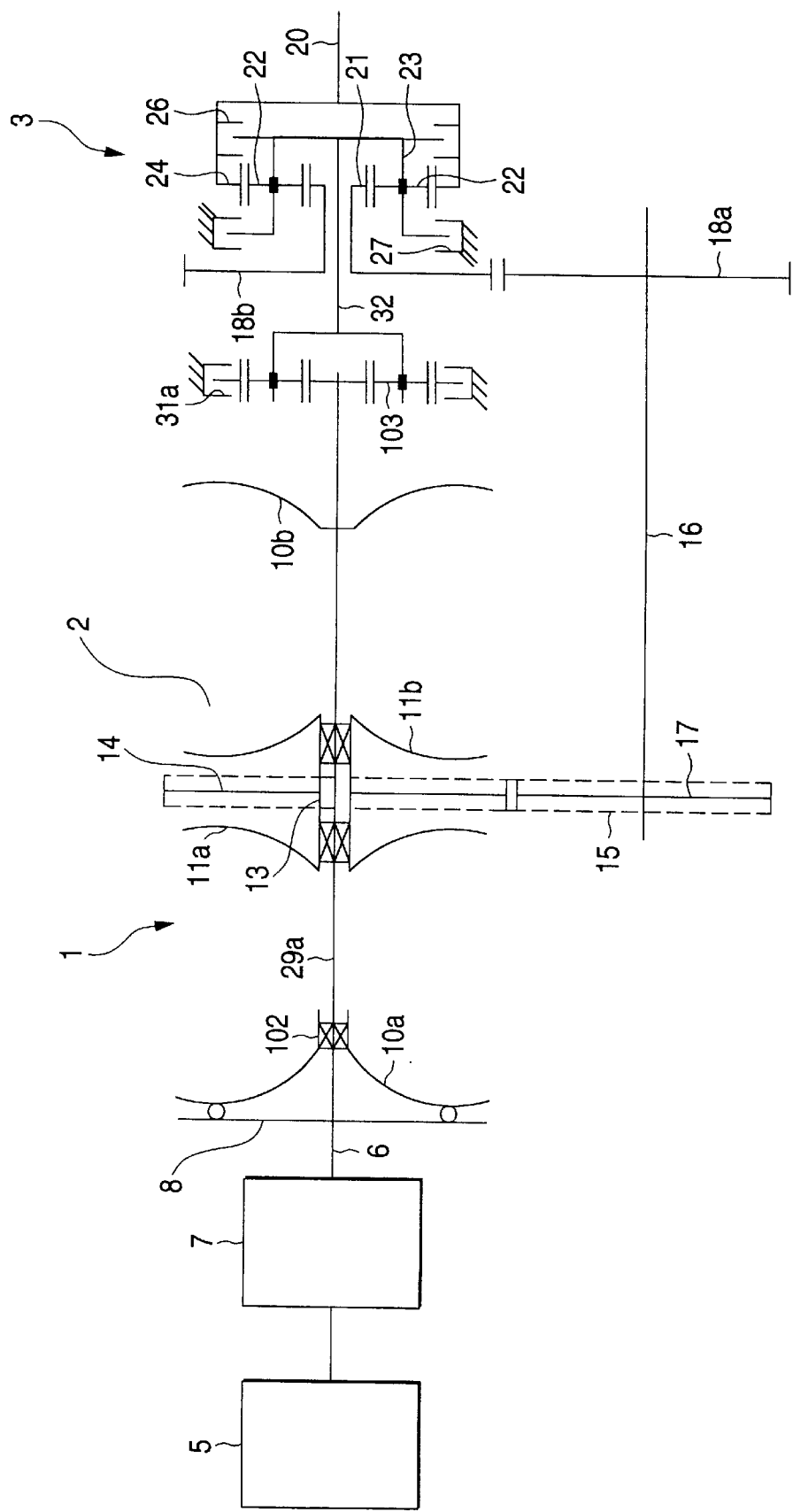
FIG. 18 is a system diagram showing a toroidal type continuous variable transmission according to a sixteenth embodiment of the present invention.
Figure 19:
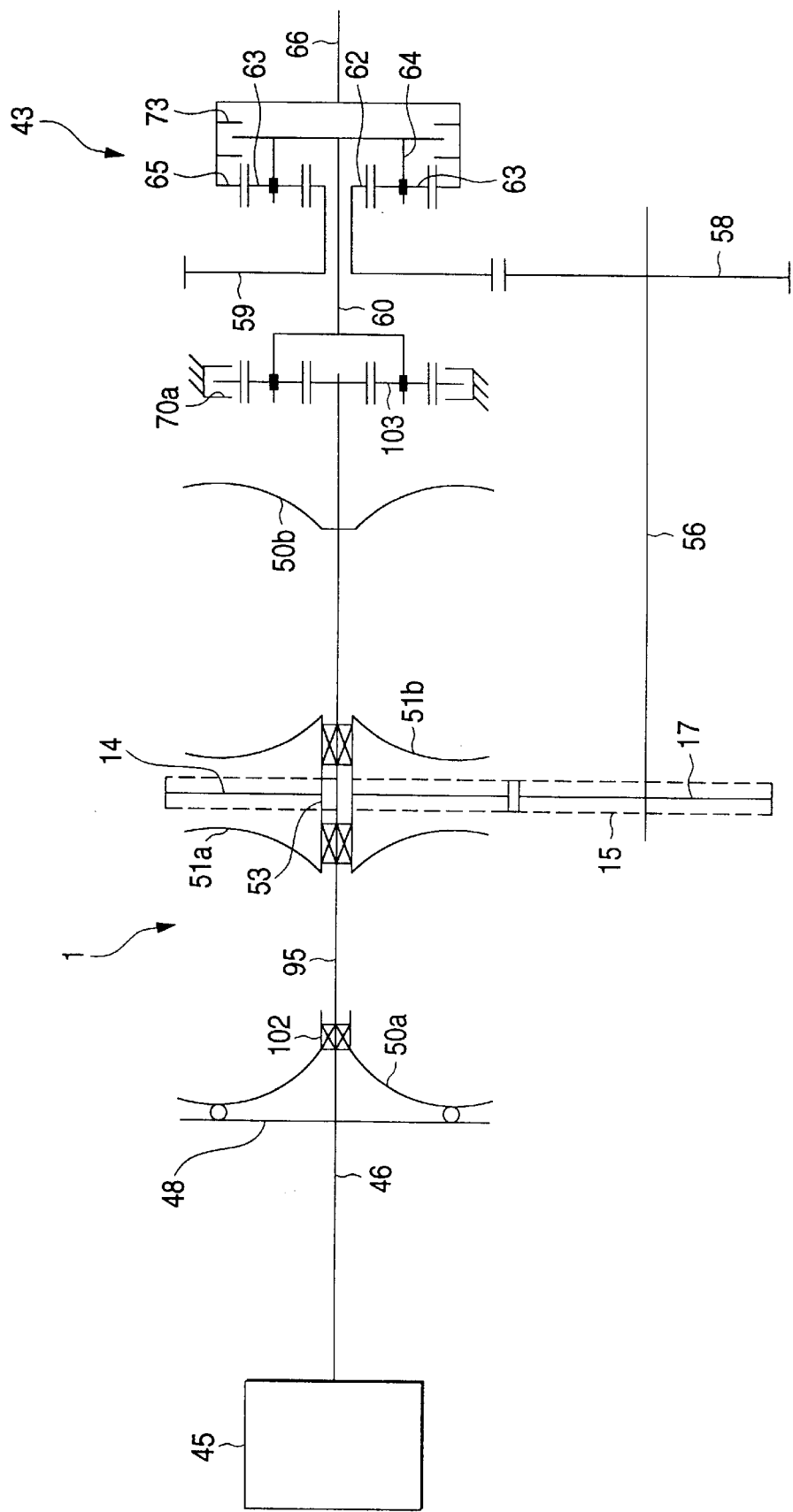
FIG. 19 is a system diagram showing a toroidal type continuous variable transmission according to a seventeenth embodiment of the present invention.

FIGS. 18 and 19 show sixteenth and seventeenth embodiments of the present invention. In the sixteenth and seventeenth embodiments, a high-speed clutch 31a (according to the sixteenth embodiment shown in FIG. 18) or a low-speed clutch 70a (according to the seventeenth embodiment shown in FIG. 19) is provided with a second planetary gear mechanism 103. In these embodiments, by means of the existence of the second planetary gear mechanism 103, the rotational speed of the carriers 23 of the planetary gear mechanisms 3 and 43 is made slower than that of the power transmission shafts 29a, 95 while the high-speed clutch 31a or the low-speed clutch 70 is held in a connected state. By making the rotational speed of the carriers 23 slower, the rotational speed of the output shafts 20, 66 is changed. In other respects, the variable transmission systems according to these embodiments are identical in operation and configuration with that described in the fourteenth or fifteenth embodiment. Accordingly, the elements which are the same as those in the fourteenth or fifteenth embodiment are assigned the same reference numerals, and repetition of their descriptions will be omitted here.

As has been described above, according to the present invention, a power transmission mechanism which bypasses a variator is provided in a path over which power is transmitted from an input shaft rotated by a power source to a mechanical pressing mechanism, thus preventing excessive pressing force being exerted on the variator. As a result, the load exerted on the variator can be reduced, and the durability of the variator can be improved.

Further, use of a single planet gear mechanism renders the overall toroidal type continuous variable transmission system compact and light-weight.

Furthermore, according to the present invention, appropriate thrust can be imparted to the variable transmission system by controlling hydraulic pressure, and the torque input to the variator through power circulation at the time of high-speed driving can be reduced. Moreover, the torque input to the variator through power circulation at the time of high-speed driving can be reduced, thereby reducing the proportion of torque accounting for the overall load exerted on the variator and hence improving the durability of the constituent components of the variator. Still further, the transmission is of double cavity type, and hence great torque can be transmitted, and use of a single planet gear mechanism renders the overall toroidal type continuous variable transmission system compact and light-weight.

According to the present invention, the input disk provided nearby the loading cam is rotatable in association with rotation of the input shaft, by means of the loading cam. As a result, the magnitude of the force required by the loading cam to press the input disk becomes equal to the magnitude of torque transmitted by way of the input disks, power rollers, and output disks.

Since the variable transmission system according to the present invention operates in the manner as mentioned previously and is constructed in the manner as mentioned previously, the contact pressure between the internal surfaces of the input and output disks and the circumferential surfaces of the power rollers can be maintained appropriately, thus preventing the contact pressure exerted on the surface of these disks and rollers from becoming excessive or slippage from arising in the surface contact area between the disks and the rollers. As a result, the durability and efficiency of the variable transmission system are improved.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A toroidal continuous variable transmission system to be used as a transmission of an automobile comprising:
    an input shaft rotatably actuated by means of a drive source;
    an output shaft for acquiring power stemming from rotation of the input shaft;
    a variator which is interposed between said input and output shafts, is disposed on the drive source side, and includes,
        a pair of input disks which rotate on the basis of rotation of said input shaft,
        a pair of output disks which rotate synchronously with each other that are provided in a coaxial relationship with said input disks, and
        power rollers which are provided between the input and output disks while remaining in contact with the disks and which rotate at an angle;
    a planetary gear mechanism which is interposed between said input and output shafts is disposed coaxially with said drive source and said variator, and includes,
        a sun gear,
        a ring gear provided around said sun gear,
        a plurality of planetary gears which are provided between said sun gear and said ring gear so as to be rotatable, and
        carriers supporting said planetary gears,
    a pressing mechanism which presses one of said input disks and said output disks against the other by way of said power rollers;
    a first power transmission mechanism which transmits said rotation of said output disks to said planetary gear mechanism; and
    a second power transmission mechanism which transmits the rotation of said input shaft to said planetary gear mechanism,
    so that said first power transmission mechanism circulates the power of said planetary gear mechanism through said variator, and said second power transmission mechanism transmits the rotation of said input shaft to the planetary gear mechanism by bypassing said variator.

2. A toroidal continuous variable transmission system to be used as a transmission of an automobile comprising:
    an input shaft rotatively actuated by means of a drive source;
    an output shaft for acquiring power stemming from rotation of the input shaft;
    a variator which is interposed between the input and output shafts, is disposed on the drive source side, and includes,
        a pair of input disks which rotate in association with rotation of the input shaft,
        a pair of output disks which rotate synchronously with each other that are provided in a coaxial relationship with the input disks, and
        power rollers which are provided between the input and output disks while remaining in contact with the disks and which rotate at an angle;
    a planetary gear mechanism which is interposed between the input and output shafts, is disposed coaxially with both of said drive source and said variator, and includes,
        a sun gear,
        a ring gear provided around the sun gear,
        a plurality of planetary gears which are provided between the sun gear and the ring gear so as to be rotatable, and
        carriers supporting the planetary gears,
    a mechanical pressing mechanism which presses one of said pair of input disks against one of said pair of output disks, or one of said pair of output disks against one of said pair of input disks by way of the power rollers;
    a first power transmission mechanism which transmits the rotation of the output disks to the planetary gear mechanism and circulates the power of the planetary gear mechanism through the variator; and
    a second power transmission mechanism which transmits the rotation of the input shaft to the planetary gear mechanism by bypassing the variator.

3. The toroidal continuous variable transmission system as defined in claim 2, wherein said pair of input disks are provided at the center of said variator so as to face opposite directions, said pair of output disks are provided so as to face said inputs disks, said ring gear rotates said output shaft, said second power transmission mechanism includes a bypass shaft which transmits the rotation of said input shaft to said planetary gear mechanism by bypassing said variator, and said bypass shaft is disposed at the outside of said variator.

4. The toroidal continuous variable transmission system as defined in claim 2, wherein said mechanical pressing mechanism presses one of said input disks against one of said output disks by way of said power rollers.

5. The toroidal continuous variable transmission system as defined in claim 4, wherein said ring gear rotates said output shaft, and
    wherein said first power transmission mechanism is constituted of a counter shaft which transmits the rotation of said output disk to said sun gear and circulates the power of said planetary gear mechanism through said variator, and said second power transmission mechanism is constituted of a bypass shaft which transmits the rotation of said input shaft to said carriers by bypassing said variator.

6. The toroidal continuous variable transmission system as defined in claim 5, wherein said bypass shaft is provided outside of said variator and transmits the rotation of said input shaft to said carriers.

7. The toroidal continuous variable transmission system as defined in claim 2, wherein said mechanical pressing mechanism presses one of said output disks against one of said input disks by way of said power rollers.

8. The toroidal continuous variable transmission system as defined in claim 7, wherein said ring gear rotates said output shaft, said first power transmission mechanism includes a counter shaft which transmits the rotation of said output disks to said sun gear and circulates the power of said planetary gear mechanism through said variator, said second power transmission mechanism includes a power transmission shaft which transmits the rotation of said input shaft to said planetary gear mechanism by bypassing said variator, and said power transmission shaft passes through the inside of said variator.

9. A toroidal continuous variable transmission system to be used as a transmission of an automobile comprising:
   a start clutch for transmitting an output from a drive source;
   an input shaft rotatably actuated by means of the drive source;
   an output shaft for acquiring power stemming from rotation of the input shaft;
   a variator which is interposed between the input and output shafts and includes
      a pair of input disks which are provided so as to face each other and rotate in association with rotation of the input shaft,
      a pair of output disks which rotate synchronously with each other that are provided between the pair of input disks in a coaxial relationship with the input disks, and
      power rollers which are provided between the input and output disks while remaining in contact with the disks and which rotate at an angle;
   a planetary gear mechanism which is interposed between the input and output shafts and includes
      a sun gear for rotating the output shaft,
      a ring gear provided around the sun gear,
      a plurality of planetary gears which are provided between the sun gear and the ring gear so as to be rotatable, and
      carriers supporting the planetary gears,
   a hydraulic pressing mechanism which is interposed between the input shaft and the input disks and presses one of said input disks against one of said output disks by way of the power rollers;
   a first power transmission mechanism which transmits the rotation of the output disks to the carriers; and
   a second power transmission mechanism which transmits the rotation of the input shaft to the ring gear.

10. A toroidal continuous variable transmission system to be used as a transmission of an automobile comprising:
   an input shaft rotatably actuated by means of a drive source;
   an output shaft for acquiring power stemming from rotation of said input shaft;
   a variator which is interposed between said input and output shafts, is disposed on the drive source side, and includes,
      a pair of input disks which rotate on the basis of rotation of said input shaft,
      a pair of output disks which rotate synchronously with each other that are provided in a coaxial relationship with the input disks, and
      power rollers which are provided between said input and output disks while remaining in contact with said disks and which rotate at an angle;
   a planetary gear mechanism which is interposed between said input and output shafts, is disposed coaxially with said drive source and said variator and includes
      a sun gear,
      a ring gear provided around said sun gear,
      a plurality of planetary gears which are provided between said sun gear and said ring gear so as to be rotatable, and
      carriers supporting said planetary gears,
   a loading cam which is provided between said input shaft and said input disks and presses one of said input disks against one of said output disks by way of said power rollers; and
   a power transmission shaft provided in a coaxial relationship with said input shaft, wherein the rotation of said power transmission shaft is freely input to one member of the group consisting of said sun gear, said ring gear, and said carriers; the rotation of said pair of output disks is freely input to another member of said group, to which the rotation of said power transmission shaft is not transmitted; and the other one member of said group to which neither the rotation of said power transmission shaft nor the rotation of said output disk is transmitted is connected to said output shaft,
   wherein said input shaft and said power transmission shaft are rotatable synchronous with each other, one of said pair of input disks located close to the loading cam is rotatable supported on the power transmission shaft so as to rotate in accordance with the rotation of said input shaft through said loading cam, and the other of said pair of input disks located away from the loading cam is coupled with said power transmission shaft so as to rotate synchronously with said power transmission shaft.

11. A toroidal continuous variable transmission system to be used as a transmission of an automobile comprising:
   an input shaft rotatively actuated by means of a drive source;
   an output shaft for acquiring power stemming from rotation of the input shaft;
   a variator which is interposed between the input and output shafts, and includes,
      a pair of input disks, provided at the center of said variator so as to face opposite directions, which rotate in association with rotation of the input shaft,
      a pair of output disks which rotate synchronously with each other that are provided in a coaxial relationship with said input disks so as to face said input disks, and
      power rollers which are provided between the input and output disks while remaining in contact with the disks and which rotate at an angle;
   a planetary gear mechanism which is interposed between the input and output shafts, and includes,
      a sun gear which rotates said output shaft,
      a ring gear provided around the sun gear,
      a plurality of planetary gears which are provided between the sun gear and the ring gear so as to be rotatable, and
      carriers supporting the planetary gears,
   a mechanical pressing mechanism which presses one of said pair of input disks against one of said pair of output disks by way of the power rollers;
   a first power transmission mechanism which transmits the rotation of the output disks to the planetary gear mechanism and circulates the power of the planetary gear mechanism through the variator; and a second power transmission mechanism which transmits the rotation of the input shaft to the planetary gear mechanism by bypassing the variator.

12. The toroidal continuous variable transmission system as defined in claim 11, wherein said first power transmission mechanism transmits the rotation of said output disks to said carriers, and said second power transmission mechanism is constituted of a bypass shaft which transmits the rotation of said input shaft and that of said input disks to said planetary gear mechanism by bypassing said variator.

13. A toroidal continuous variable transmission system to be used as a transmission of an automobile comprising:
   an input shaft rotatively actuated by means of a drive source;
   an output shaft for acquiring power stemming from rotation of the input shaft;
   a variator which is interposed between the input and output shafts, and includes,
      a pair of input disks, provided at the center of said variator so as to face opposite directions, which rotate in association with rotation of the input shaft,
      a pair of output disks which rotate synchronously with each other that are provided in a coaxial relationship with said input disks so as to face said input disks, and
      power rollers which are provided between the input and output disks while remaining in contact with the disks and which rotate at an angle;
   a planetary gear mechanism which is interposed between the input and output shafts, and includes,
      a sun gear which rotates said output shaft,
      a ring gear provided around the sun gear,
      a plurality of planetary gears which are provided between the sun gear and the ring gear so as to be rotatable, and
      carriers supporting the planetary gears,
   a mechanical pressing mechanism which presses one of said pair of output disks against one of said pair of input disks by way of the power rollers;
   a first power transmission mechanism which transmits the rotation of the output disks to the planetary gear mechanism and circulates the power of the planetary gear mechanism through the variator; and
   a second power transmission mechanism which transmits the rotation of the input shaft to the planetary gear mechanism by bypassing the variator.

14. The toroidal continuous variable transmission system as defined in claim 13, wherein said first power transmission mechanism transmits the rotation of said output disks to said carriers, and said second power transmission mechanism is constitited of a bypass shaft which transmits the rotation of said input shaft and that of said input disks to said planetary gear mechanism by bypassing said variator.

15. A toroidal continuous variable transmission system to be used as a transmission of an automobile comprising:
   an input shaft rotatively actuated by means of a drive source;
   an output shaft for acquiring power stemming from rotation of the input shaft;
   a variator which is interposed between the input and output shafts, and includes,
      a pair of input disks which rotate in association with rotation of the input shaft,
      a pair of output disks which rotate synchronously with each other that are provided in a coaxial relationship with said input disks, and
      power rollers which are provided between the input and output disks while remaining in contact with the disks and which rotate at an angle;
   a planetary gear mechanism which is interposed between the input and output shafts, and includes,
      a sun gear which rotates said output shaft,
      a ring gear provided around the sun gear,
      a plurality of planetary gears which are provided between the sun gear and the ring gear so as to be rotatable, and
      carriers supporting the planetary gears,
   a mechanical pressing mechanism which presses one of said pair of input disks against one of said pair of output disks by way of the power rollers;
   a first power transmission mechanism including,
      a counter shaft which transmits the rotation of said output disks to said carriers and circulates the power of said planetary gear mechanism through said variator; and
   a second power transmission mechanism including,
      a bypass shaft which transmits the rotation of said input shaft to said planetary gear mechanism by bypassing said variator.

16. The toroidal continuous variable transmission system as defined in claim 15, wherein said bypass shaft passes through the inside of said variator and transmits the rotation of said input shaft to said ring gear.

17. The toroidal continuous variable transmission system as defined in claim 15, wherein said bypass shaft is provided outside said variator and transmits the rotation of said input shaft to said ring gear.

18. A toroidal continuous variable transmission system to be used as a transmission of an automobile comprising:
   an input shaft rotatively actuated by means of a drive source;
   an output shaft for acquiring power stemming from rotation of the input shaft;
   a variator which is interposed between the input and output shafts, and includes,
      a pair of input disks which rotate in association with rotation of the input shaft,
      a pair of output disks which rotate synchronously with each other that are provided in a coaxial relationship with said input disks, and
      power rollers which are provided between the input and output disks while remaining in contact with the disks and which rotate at an angle;
   a planetary gear mechanism which is interposed between the input and output shafts, and includes,
      a sun gear,
      a ring gear provided around the sun gear which rotates said output shaft,
      a plurality of planetary gears which are provided between the sun gear and the ring gear so as to be rotatable, and
      carriers supporting the planetary gears,
   a mechanical pressing mechanism which presses one of said pair of output disks against one of said pair of input disks by way of the power rollers;
   a first power transmission mechanism including,
      a counter shaft which transmits the rotation of said output disks to said carriers and circulates the power of said planetary gear mechanism through said variator; and
   a second power transmission mechanism which transmits the rotation of the input shaft to the planetary gear mechanism by bypassing the variator.

19. A toroidal continuous variable transmission system to be used as a transmission of an automobile comprising:
- an input shaft rotatively actuated by means of a drive source;
- an output shaft for acquiring power stemming from rotation of the input shaft;
- a variator which is interposed between the input and output shafts, and includes,
  - a pair of input disks which rotate in association with rotation of the input shaft,
  - a pair of output disks which rotate synchronously with each other that are provided in a coaxial relationship with said input disks, and
  - power rollers which are provided between the input and output disks while remaining in contact with the disks and which rotate at an angle;
- a planetary gear mechanism which is interposed between the input and output shafts, and includes,
  - a sun gear,
  - a ring gear provided around the sun gear, said ring gear rotating said output shaft,
  - a plurality of planetary gears which are provided between the sun gear and the ring gear so as to be rotatable, and
  - carriers supporting the planetary gears,
- a mechanical pressing mechanism which presses one of said pair of input disks against of said pair of output disks by way of the power rollers;
- a first power transmission mechanism including,
  - a counter shaft which transmits the rotation of said output disks to said sun gear and circulates the power of said planetary gear mechanism through said variator; and
- a second power transmission mechanism including,
  - a bypass shaft which transmits the rotation of said input shaft to said carrier by bypassing said variator,
- wherein said bypass shaft passes through the inside of said variator and transmits the rotation of said input shaft to said carriers.

* * * * *